US012359403B2

(12) United States Patent
Jordan et al.

(10) Patent No.: US 12,359,403 B2
(45) Date of Patent: Jul. 15, 2025

(54) SYSTEMS, METHODS, AND CONTROLLERS TO ENHANCE HEAVY EQUIPMENT WARNING

(71) Applicant: MARATHON PETROLEUM COMPANY LP, Findlay, OH (US)

(72) Inventors: Kyle D. Jordan, Findlay, OH (US); Nicholas L. Schimmoeller, Findlay, OH (US); George M. Lixey, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 142 days.

(21) Appl. No.: 18/238,843

(22) Filed: Aug. 28, 2023

(65) Prior Publication Data

US 2023/0399818 A1    Dec. 14, 2023

Related U.S. Application Data

(60) Division of application No. 18/144,290, filed on May 8, 2023, now Pat. No. 11,808,013, which is a
(Continued)

(51) Int. Cl.
*E02F 9/22* (2006.01)
*B60Q 1/26* (2006.01)
(Continued)

(52) U.S. Cl.
CPC ............ *E02F 9/226* (2013.01); *B60Q 1/2611* (2013.01); *B60Q 1/2615* (2013.01);
(Continued)

(58) Field of Classification Search
CPC . E02F 9/226; E02F 9/2004; E02F 9/24; E02F 9/26; B60Q 1/2611; B60Q 1/2615; B60Q 5/005
See application file for complete search history.

(56) References Cited

U.S. PATENT DOCUMENTS

| 2,626,627 A | 1/1953 | Jung et al. |
| 2,864,252 A | 12/1958 | Schaschl |

(Continued)

FOREIGN PATENT DOCUMENTS

| AU | 2010241217 | 11/2010 |
| AU | 2013202839 | 5/2014 |

(Continued)

OTHER PUBLICATIONS

Annex to Form PCT/ISA/206, Communication Relating to the Results of the Partial International Search for international application No. PCT/US2024/021101 mailed Aug. 13, 2024.
(Continued)

*Primary Examiner* — Hoi C Lau
(74) *Attorney, Agent, or Firm* — RAY QUINNEY & NEBEKER P.C.; Paul N. Taylor

(57) ABSTRACT

Systems and methods to activate one or more indicators, positioned on heavy hydraulic-based equipment to provide indication that the heavy hydraulic-based equipment is in an operation are described herein. The system may include a hydraulic initiation lever positioned proximate an operator's seat of the equipment and configured to be actuatable to an inactive position and an active position, the hydraulic initiation lever when in the active position configured to generate an unlock signal to thereby enable hydraulic operation of the heavy hydraulic-based equipment. The system may include one or more indicators configured to receive the unlock signal, the one or more indicators configured to activate in response to reception of the unlock signal and to deactivate in response to no reception of the unlock signal.

25 Claims, 15 Drawing Sheets

Related U.S. Application Data continuation of application No. 17/848,429, filed on Jun. 24, 2022, now Pat. No. 11,686,070.

(60) Provisional application No. 63/364,179, filed on May 4, 2022.

(51) Int. Cl.
   *B60Q 5/00* (2006.01)
   *E02F 9/20* (2006.01)
   *E02F 9/24* (2006.01)
   *E02F 9/26* (2006.01)

(52) U.S. Cl.
   CPC ............ *E02F 9/2004* (2013.01); *E02F 9/24* (2013.01); *E02F 9/26* (2013.01); *B60Q 5/005* (2013.01); *E02F 9/2066* (2013.01)

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,925,592 A | 12/1975 | Webb |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,315,602 A | 2/1982 | Kubacak |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,784,324 A | 11/1988 | DeWitt |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,423,607 A | 6/1995 | Jones |
| 5,469,830 A | 11/1995 | Gonzalez |
| 5,516,967 A | 5/1996 | Pandey |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,660,602 A | 8/1997 | Collier, Jr. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A * | 10/1999 | Botella .................. F16H 63/42 340/461 |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,220,747 B1 | 4/2001 | Gosselin |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,121,040 B2 | 10/2006 | Wiese |
| 7,168,464 B2 | 1/2007 | Diggins |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |

(56) References Cited

U.S. PATENT DOCUMENTS

| | | |
|---|---|---|
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,497,956 B2 | 11/2016 | Dubose |
| 9,518,693 B2 | 12/2016 | Hodde |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,168,255 B1 | 1/2019 | Johnsen |
| 10,196,243 B1 | 2/2019 | Wells |
| 10,197,206 B1 | 2/2019 | Dray et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,405,475 B2 | 9/2019 | Goda |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2* | 4/2020 | Shibamori ............... E02F 9/26 |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,027,304 B2 | 6/2021 | Donaldson |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,320,519 B2 | 5/2022 | Koivuranta |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,441,088 B2 | 9/2022 | Robbins |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1* | 6/2023 | Jordan ..................... E02F 9/26 |
| | | 340/468 |
| 11,687,858 B2 | 6/2023 | Rentz |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,761,366 B2 | 9/2023 | Thobe |
| 11,774,042 B2 | 10/2023 | Thobe |
| 11,789,453 B2 | 10/2023 | Chowdhary |
| 11,794,153 B2 | 10/2023 | Miller |
| 11,807,945 B2 | 11/2023 | Ell |
| 11,808,013 B1* | 11/2023 | Jordan ................ B60Q 1/2611 |
| 11,815,227 B2 | 11/2023 | Thobe |
| 11,842,538 B2 | 12/2023 | Saxena |
| 11,891,775 B2* | 2/2024 | Chiba .................. E02F 9/2285 |
| 11,920,504 B2 | 3/2024 | Thobe |
| 11,965,317 B2* | 4/2024 | Jordan ................. E02F 9/2004 |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 | 6/2024 | Thobe |
| 12,043,361 B1 | 7/2024 | Ernst |
| 12,043,905 B2 | 7/2024 | Ell |
| 12,043,906 B2 | 7/2024 | Ell |
| 12,066,843 B2 | 8/2024 | Miller |
| 12,087,002 B1 | 9/2024 | Miller et al. |
| 12,109,543 B2 | 10/2024 | Miller |
| 12,128,369 B2 | 10/2024 | Miller |
| 12,129,559 B2 | 10/2024 | Ell |
| 12,163,625 B2 | 12/2024 | Thobe |
| 12,180,597 B2 | 12/2024 | Ell |
| 2001/0013517 A1 | 8/2001 | Hart |
| 2002/0014068 A1 | 2/2002 | Mittricker et al. |
| 2002/0178806 A1 | 12/2002 | Valentine |
| 2002/0185180 A1 | 12/2002 | Smith |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1* | 9/2003 | Kondou ..................... E02F 9/02 |
| | | 37/348 |
| 2003/0178994 A1 | 9/2003 | Hurlimann et al. |
| 2003/0188536 A1 | 10/2003 | Mittricker |
| 2003/0197622 A1* | 10/2003 | Reynard ............ B65G 69/2876 |
| | | 340/425.5 |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0251313 A1 | 12/2004 | Burgess |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1* | 7/2005 | Ward ....................... G01L 19/12 |
| | | 340/626 |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0263283 A1 | 11/2006 | Egan |
| 2006/0278304 A1 | 12/2006 | Mattingly et al. |
| 2007/0175511 A1 | 8/2007 | Doerr |
| 2007/0181083 A1 | 8/2007 | Fulton |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2008/0296031 A1* | 12/2008 | Yeager .................. E02F 3/3663 |
| | | 172/272 |
| 2009/0009308 A1* | 1/2009 | Date ......................... B60R 1/26 |
| | | 340/439 |
| 2009/0107111 A1 | 4/2009 | Oliver |
| 2009/0154288 A1 | 6/2009 | Heathman |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2009/0278839 A1 | 11/2009 | Geis |
| 2010/0031825 A1 | 2/2010 | Kemp |
| 2010/0049410 A1* | 2/2010 | McKee .................. E02F 9/2012 |
| | | 701/50 |

(56) References Cited

U.S. PATENT DOCUMENTS

| | | |
|---|---|---|
| 2010/0058666 A1 | 3/2010 | Kim |
| 2010/0175316 A1 | 7/2010 | Kubacak |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0153042 A1 | 6/2012 | Oedekoven |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1* | 2/2013 | Nakamura ............... E02F 9/267 |
| | | 701/36 |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2013/0317959 A1 | 11/2013 | Joos |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1 | 5/2014 | Yoel |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0172513 A1 | 6/2014 | MacLean |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1 | 9/2015 | Moore |
| 2015/0323119 A1 | 11/2015 | Giunta |
| 2016/0071059 A1 | 3/2016 | Petering |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0021769 A1* | 1/2017 | Izumikawa ............... G05B 15/02 |
| 2017/0051472 A1 | 2/2017 | Mochimaru |
| 2017/0088401 A1 | 3/2017 | Clements et al. |
| 2017/0121941 A1* | 5/2017 | Chioccola ............... E02F 9/264 |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1* | 8/2018 | Shibamori ............... E02F 9/24 |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0118413 A1 | 4/2020 | Kanukurthy |
| 2020/0232191 A1* | 7/2020 | Prior ............... E02F 9/264 |
| 2020/0235559 A1 | 7/2020 | Neuenschwander |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0123211 A1* | 4/2021 | Miller ............... E02F 9/226 |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0348281 A1 | 11/2021 | da Costa |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1* | 3/2022 | Karbassi ............... B66C 23/54 |
| 2022/0087099 A1 | 3/2022 | Hoffman et al. |
| 2022/0154427 A1* | 5/2022 | Misaki ............... E02F 9/2267 |
| 2022/0178114 A1 | 6/2022 | Takahama |
| 2022/0183208 A1 | 6/2022 | Sibley |
| 2022/0186470 A1* | 6/2022 | Chiba ............... E02F 9/2285 |
| 2022/0213603 A1 | 7/2022 | Al Eid et al. |
| 2022/0221368 A1 | 7/2022 | Bergeron |
| 2022/0228345 A1* | 7/2022 | Case ............... E02F 9/16 |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2022/0405870 A1 | 12/2022 | Conway |
| 2023/0012038 A1 | 1/2023 | Iyer |
| 2023/0012673 A1 | 1/2023 | Fukuyama et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0279638 A1* | 9/2023 | Danguchi ............... E02F 9/24 |
| | | 701/50 |
| 2023/0286525 A1* | 9/2023 | Danguchi ............... E02F 9/26 |
| 2023/0332532 A1 | 10/2023 | Thobe |
| 2023/0333577 A1 | 10/2023 | Miller |
| 2023/0333578 A1 | 10/2023 | Miller |
| 2023/0338897 A1 | 10/2023 | Bednar |
| 2023/0341092 A1 | 10/2023 | Thobe |
| 2023/0347303 A1 | 11/2023 | Miller |

(56) References Cited

U.S. PATENT DOCUMENTS

| | | | |
|---|---|---|---|
| 2023/0358023 A1* | 11/2023 | Jordan | E02F 9/226 |
| 2023/0360151 A1 | 11/2023 | Swamy | |
| 2023/0366510 A1 | 11/2023 | Thobe | |
| 2023/0383416 A1 | 11/2023 | Ell | |
| 2023/0383417 A1 | 11/2023 | Ell | |
| 2023/0383418 A1 | 11/2023 | Ell | |
| 2023/0392536 A1 | 12/2023 | Thobe | |
| 2023/0399817 A1* | 12/2023 | Jordan | E02F 9/2004 |
| 2023/0399818 A1* | 12/2023 | Jordan | E02F 9/26 |
| 2023/0407488 A1 | 12/2023 | Ell | |
| 2023/0415106 A1 | 12/2023 | Miller | |
| 2024/0003016 A1 | 1/2024 | Ell | |
| 2024/0060189 A1 | 2/2024 | Ell | |
| 2024/0071073 A1 | 2/2024 | Rajora | |
| 2024/0141506 A1 | 5/2024 | Eii | |
| 2024/0166492 A1 | 5/2024 | Thobe | |
| 2024/0209988 A1 | 6/2024 | Thobe | |
| 2024/0217498 A1 | 7/2024 | Pittman, Jr. | |
| 2024/0255102 A1 | 8/2024 | Thobe | |
| 2024/0269626 A1 | 8/2024 | Miller | |
| 2024/0271556 A1 | 8/2024 | Thobe | |
| 2024/0278762 A1 | 8/2024 | Pittman, Jr. | |
| 2024/0278894 A1 | 8/2024 | Ernst | |
| 2024/0286726 A1 | 8/2024 | Ernst | |
| 2024/0301811 A1 | 9/2024 | Thobe | |
| 2024/0327992 A1 | 10/2024 | Ell | |
| 2024/0327993 A1 | 10/2024 | Ell | |

FOREIGN PATENT DOCUMENTS

| | | |
|---|---|---|
| AU | 2009202785 B | 11/2014 |
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 202898548 U | 4/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 104372350 B | 2/2017 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 115325460 A | 11/2022 |
| CN | 114877263 | 4/2023 |
| CN | 220458389 U | 2/2024 |
| EP | 2586304 A1 | 5/2013 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 20200007444 A | 1/2020 |
| KR | 102129951 | 7/2020 |
| KR | 102169280 | 10/2020 |
| KR | 102281640 | 7/2021 |
| RU | 2760879 | 12/2021 |
| RU | 217534 U1 | 4/2023 |
| WO | 1996006685 | 5/1996 |
| WO | 1997006004 | 2/1997 |
| WO | 1997006298 | 2/1997 |
| WO | 1998003711 | 1/1998 |
| WO | 199917606 | 4/1999 |
| WO | 2000063108 | 10/2000 |
| WO | 2002030551 | 4/2002 |
| WO | 2002082181 | 10/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010002274 | 1/2010 |
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2022269052 | 12/2022 |
| WO | 2023287276 | 1/2023 |
| WO | 2023021769 | 2/2023 |
| WO | 2023038579 | 3/2023 |
| WO | 2023060350 | 4/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Sadovnychiy, Sergiy et al. "Geographical information system applications for pipeline right of way aerial surveillance", International Conference on Geographical Information Systems Theory, Applications and Management, vol. 2, Scitepress, 2017.

Paschal, Kayla, "Utility Right of Way Management: Potential for Expanded Integrated Vegetation Management in California", 2014.

Skelton et al., Onboard Refueling Vapor Recovery Systems Analysis of Widespread Use, Nescaum, Boston MA, Aug. 20, 2007.

(56) References Cited

OTHER PUBLICATIONS

Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
International Search Report and Written Opinion for international application No. PCT/US2024/021099 mailed on Aug. 2, 2024.
International Search Report and Written Opinion for international application No. PCT/US2024/021101 mailed on Oct. 9, 2024.
Alexandrakis et al., "Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Lloyd's Register, Using technology to trace the carbon intensity of sustainable marine fuels, Feb. 15, 2023.

\* cited by examiner

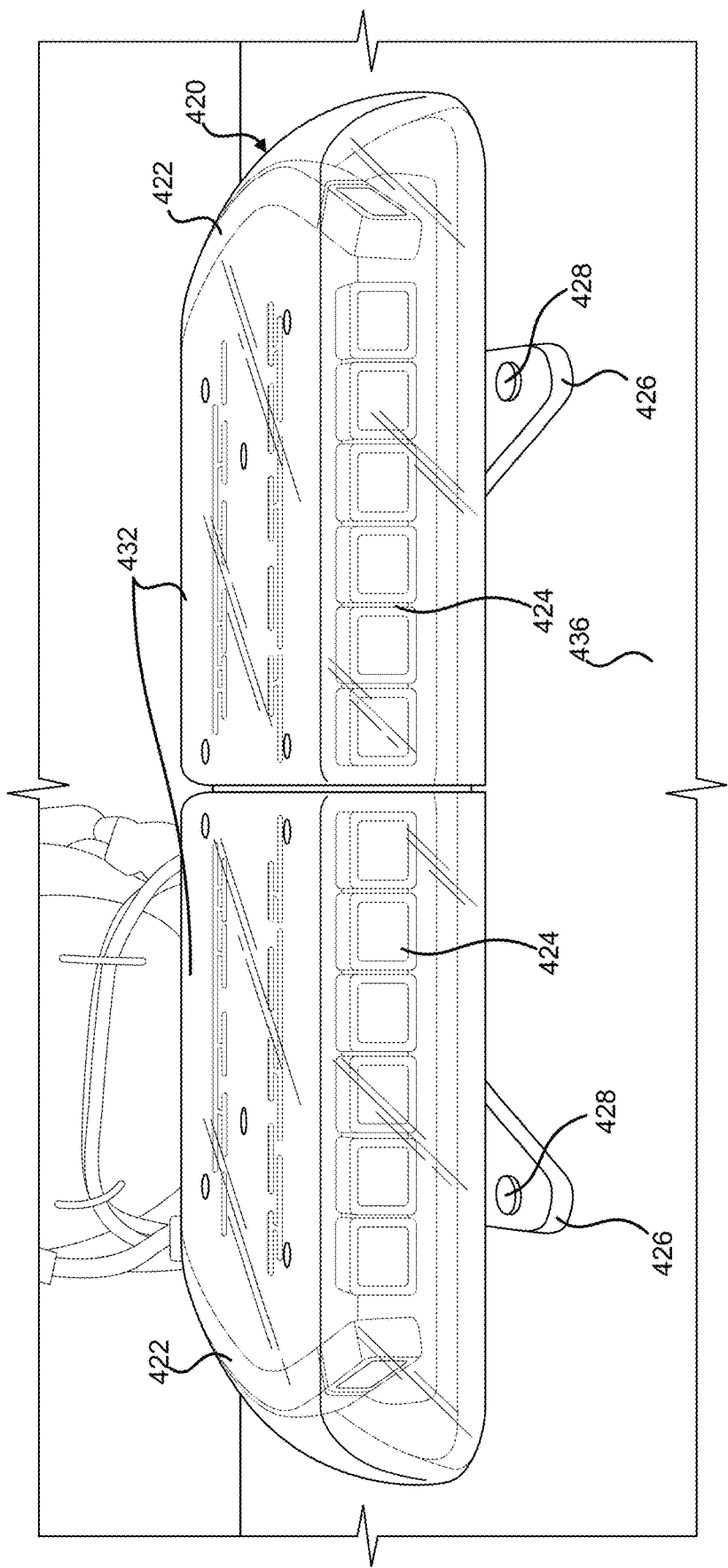

SYSTEMS, METHODS, AND CONTROLLERS TO ENHANCE HEAVY EQUIPMENT WARNING

PRIORITY CLAIM

This application is a divisional of U.S. Non-Provisional application Ser. No. 18/144,290, filed May 8, 2023, titled "SYSTEMS, METHODS, AND CONTROLLERS TO ENHANCE HEAVY EQUIPMENT WARNING," which is a continuation of U.S. Non-Provisional application Ser. No. 17/848,429, filed Jun. 24, 2022, titled "SYSTEMS, METHODS, AND CONTROLLERS TO ENHANCE HEAVY EQUIPMENT WARNING," now U.S. Pat. No. 11,686,070, issued Jun. 27, 2023, which claims priority to and the benefit of U.S. Provisional Application No. 63/364,179, filed May 4, 2022, titled "SYSTEMS, METHODS, AND CONTROLLERS TO ENHANCE HEAVY EQUIPMENT WARNING," the disclosures of which are incorporated herein.

FIELD OF DISCLOSURE

Embodiments of this disclosure relate to indicator installation, mounting, and/or activation systems and methods, and more particularly, to systems and methods to activate one or more indicators via a lever of the equipment during equipment operation and/or while the hydraulics of the equipment is powered on.

BACKGROUND

Operators and other personnel typically utilize caution when working around heavy equipment. While some operators and personnel may recognize when such heavy equipment are powered on and operating, others may not recognize that heavy equipment is powered on or may not notice, due to not being able to recognize operation characteristics of the heavy equipment or lack of attention, that the heavy equipment is active. Some heavy equipment may include lights, however those lights activate only when the heavy equipment vehicle is moving and position of those lights may not be optimal for recognition by others. In some circumstances, an operator or other personnel may not be aware the heavy equipment vehicle is powered on and active until the operator or personnel are too close or may not notice a light that only activates when the equipment is actively moving, as such heavy equipment does not constantly move.

Accordingly, Applicant has recognized a need for a system and methods to activate one or more indicators via actuation of a lever, the one or more indicators to warn or indicate that heavy equipment hydraulic functionality and/or hydraulic operation controls are enabled. The present disclosure is directed to embodiments of such systems and methods.

SUMMARY

The present disclosure is generally directed to systems and methods to activate one or more indicators, in addition to heavy equipment functionality and/or hydraulic functionality, via actuation of a lever or hydraulic initiation lever, the one or more indicators to warn or indicate that heavy equipment is being operated or may be operated at any moment. The one or more indicators may be included on, added to, installed on, or mounted to various selected outer surfaces of heavy equipment. The locations of the outer surfaces may be selected based on visibility (e.g., some areas allow for more illumination and/or unobstructed views). The heavy equipment may include a vehicle or equipment configured and sized to perform a specified construction task. Types of heavy equipment may include one or more of an excavator, a bulldozer, a backhoe, a trencher, a loader, a grader, a paver, a compactor, a crane, a telehandler, a feller buncher, pile boring equipment, pile driving equipment, or other heavy equipment configured to utilize hydraulics.

Each of the one or more indicators may connect to or may be connected to a conductor, a wire, a wire harness, wire assemble, wire harness assembly, cable harness, cable assembly, or cable harness assembly. The conductor, a wire, a wire harness, or cable harness may be passed through a compartment and/or engine compartment of the heavy equipment to the cabin or cab of the heavy equipment. An operator or user may remove the panel of a hydraulic operation control panel. The operator or user may connect the conductor, a wire, a wire harness, or cable harness to a switch or other component (e.g., an electrical or signal communication component) positioned inside the panel of the hydraulic operational control panel.

Once each indicator is connected to the switch or other component, the operator or user may replace or re-attach the panel. The hydraulic operational control panel may include a lever and/or an additional lever. The lever may be actuated to a locked and unlocked position and/or an active or inactive position. When an operator uses the heavy equipment, the operator may first power on the power source (e.g., a battery) and/or an engine of the heavy equipment. Once the heavy equipment is powered on, the operator may actuate the lever. Such actuation may cause the additional lever to move to a horizontal position from a vertical position to thereby prevent the operator from exiting the heavy equipment. Further, the heavy equipment and/or hydraulic functionality may be inoperable until the lever is actuated to the unlocked and/or active position. Once actuated, the hydraulics may be enabled and the one or more indicators may activate.

Accordingly, an embodiment of the disclosure is directed to a system to activate one or more indicators, positioned on heavy hydraulic-based equipment to provide indication that the heavy hydraulic-based equipment is in an operation. The system may include a hydraulic initiation lever positioned proximate an operator's seat of the equipment and configured to be actuatable to an inactive position and an active position. The hydraulic initiation lever may, when in the active position, be configured to generate an unlock signal to thereby enable hydraulic operation of the heavy hydraulic-based equipment. The hydraulic initiation lever may also be configured to enable one of all operations or hydraulic operations of the heavy hydraulic-based equipment when the hydraulic initiation lever is in the active position. The hydraulic initiation lever may also, when in the inactive position, be configured to cease generation of the unlock signal. The hydraulic initiation lever may also be configured to prevent one of all operations or hydraulic operations of the heavy hydraulic-based equipment when the hydraulic initiation lever is in the inactive position. The unlock signal may be a constant value, such as a signal including a constant value of a bit or a constant voltage or low voltage. The unlock signal, in an embodiment, may include power sufficient to activate the one or more indicators. The system may include one or more indicators configured to receive the unlock signal. The one or more indicators may be configured to activate in response to reception of the unlock signal and to deactivate in response to no reception of the unlock signal. The one or more indicators may each include a power source or may receive power from a power source of the heavy equipment. The power source, in response to reception of the unlock signal by the one or more indicator, may power or may provide power to the one or more indicators.

In an embodiment, the one or more indicators may include a beacon positioned at a top and center of a cabin of the heavy hydraulic-based equipment and/or a strip light positioned at the top and rear portion of the heavy hydraulic-based equipment. In such embodiments, the beacon and strip light may be fixedly attached or removably attached to the heavy hydraulic-based equipment. The lights included in a portion of the strip light facing the cabin of the equipment are removed to thereby prevent light shining into the cabin.

In an embodiment, a lock signal may be defined by a lack of the unlock signal. In yet another embodiment, the heavy hydraulic-based equipment may include an engine. In such embodiments, the unlock signal may enable utilization of the engine and the lock signal may prevent utilization of the engine to thereby prevent movement of the heavy hydraulic-based equipment.

Another embodiment of the disclosure is directed to a system to activate one or more indicators positioned on heavy equipment to provide warning that the heavy equipment is in an operation mode. The system may include a hydraulic initiation lever positioned proximate an operator's seat of the heavy equipment and configured to be actuatable to an inactive position and an active position. The hydraulic initiation lever may be configured to, when in the inactive position, configured to prevent hydraulic operation of the heavy equipment and, when in the active position, configured to allow one or more of hydraulic operation and activate proximate hydraulic operation controls. The system may include a power source to provide power to the proximate hydraulic operation controls when the hydraulic initiation lever is in the active position. The system may include one or more indicators configured to provide warning that the heavy equipment is in the operation mode when the hydraulic initiation lever is in the active position. The system may include a switch connected to the power source, the one or more indicators, and the proximate hydraulic operation controls. The hydraulic initiation lever may be configured to close the switch when the hydraulic initiation lever is in the active position and open the switch when the hydraulic initiation lever is in the inactive position. When the switch is closed, the switch may be configured to create a circuit between the power source and the proximate hydraulic operation controls and a circuit between the power source and the one or more indicators to provide warning that the heavy equipment is in the operation mode.

In an embodiment, the switch may be positioned proximate to the hydraulic initiation lever. The hydraulic initiation lever may be positioned within reach of an operator. The one or more indicators may be positioned on one or more locations on an outer surface of the equipment. The one or more indicators may include one or more of one or more lights or one or more audio signals. The one or more lights may include one or more of a strobe light, a directional light, a beacon, underglow lights, undercarriage lights, directional lights, or some combination thereof. In an embodiment, one of the one or more lights may be positioned on a top surface of a cabin of the heavy equipment and may be configured to provide 360 degrees of illumination. The illumination may be sufficient to provide indication that hydraulics of the heavy equipment are operating or being utilized. In another embodiment, one of the one or more lights may be positioned on a top surface of a rear portion of the heavy equipment and comprises a light bar. The lights within the light bar facing towards a cabin of the heavy equipment are removed.

In an embodiment, the one or more indicators may be removeably attached or fixedly attached to the surface of the equipment. The one or more indicators may be attached to the surface of the equipment via one or more of a magnet, fastener, a mechanical bond, or some combination thereof. The one or more conductors may comprise one or more insulated wires positioned to provide an electrical connection between the power source and the one or more indicators. The fastener may include one or more of a screw, a rivet, a nut and bolt, a force fit connector and corresponding base, or some combination thereof.

Another embodiment of the disclosure is directed to a system to activate one or more lights positioned on heavy equipment to provide warning that the heavy equipment is in an operation mode. The system may include a hydraulic initiation lever positioned proximate an operator's seat of the heavy equipment and configured to be actuatable to an inactive position and an active position. The hydraulic initiation lever may be configured to, when in the inactive position, prevent one or more of hydraulic operation of the heavy equipment and, when in the active position, configured to allow one or more of hydraulic operation and activate proximate hydraulic operation controls. The system may include a power source to provide power to the proximate hydraulic operation controls when the hydraulic initiation lever is in the active position. The system may include one or more lights configured to provide illumination to warn that the heavy equipment is in the operation mode when the hydraulic initiation lever is in the active position. The system may include a switch connected to the power source, the one or more lights, and the proximate hydraulic operation controls. The switch may be positioned proximate to the hydraulic initiation lever. The hydraulic initiation lever may be configured to close the switch when the hydraulic initiation lever is in the active position and open the switch when the hydraulic initiation lever is in the inactive position. Further, when the switch is closed, the switch may be configured to create a circuit between the power source and the proximate hydraulic operation controls and a circuit between the power source and the one or more lights to provide warning that the heavy equipment is in the operation mode.

The one or more lights may be positioned on one or more outer surfaces of the heavy equipment vehicle. The one or more outer surfaces may include one or more of a top surface above a cabin of the vehicle or a top surface at a rear of the vehicle. The one or more outer surfaces may include the rear of the vehicle. The one or more lights include a color and lumens sufficient to be visible during daytime and nighttime.

Another embodiment of the disclosure is directed to a method to activate one or more indicators positioned on heavy equipment to provide warning that the heavy equipment is in an operation mode. The method may include initiating power on of a power source on equipment. The method may also include, in response to a hydraulic initiation lever being in an inactive position, actuating the hydraulic initiation lever from the inactive position to an active position. The hydraulic initiation lever may be positioned proximate an arm rest of an operator's seat of the heavy equipment and proximate hydraulic operation controls. The hydraulic initiation lever may be connected to a fixed point within a hydraulic control box and connected to a lever. At least one of the hydraulic initiation lever or the lever may prevent entry and exit into a cabin of the heavy equipment when the lever is in the active position. The lever may depress a switch when the lever is in the active position. The switch may be connected to the power source, the proximate hydraulic operation controls, and one or more indicators. The switch may form a circuit between the power source of the heavy equipment and the proximate hydraulic operation controls when the hydraulic initiation lever is in the active position to thereby activate the proximate hydraulic operation controls. Finally, the switch may form a circuit between the power source of the heavy equipment and the one or more indicators to thereby cause the one or more indicators to power on.

The method may further include, if the hydraulic initiation lever is in an active position, actuating the hydraulic initiation lever from the active position to the inactive position to cause the switch to open thereby disable hydraulic operation controls and to power off the one or more indicators. When the hydraulic initiation lever is in the inactive position one of all operation or hydraulic operation of the heavy equipment may be disabled.

Another embodiment of the disclosure is directed to a kit to provide one or more indicators to warn that heavy equipment is in an operation mode. The kit may include a container. The kit may include one or more indicators positioned in the container. The kit may include one or more wire assemblies positioned in the container. Each of the one or more wire assemblies may correspond to and be configured to connect to the one of the one or more indicators. The one or more wire assemblies may also be configured to pass through a compartment of the heavy equipment to connect to a switch in a hydraulic control compartment. A lever may be positioned on the hydraulic control compartment and accessible to an operator. The lever may be actuatable between an active position and an inactive position. The lever may be configured to, when in the active position, actuate the switch to thereby provide power to the one or more indicators through the wire assemblies to activate the one or more indicators. Finally, the lever may be configured to, when in the inactive position, prevent the operation mode of the heavy equipment.

In an embodiment, the kit may include one or more brackets positioned in the container. Each of the one or more kits may correspond to each of the one or more indicators. The one or more brackets may connect to an outer surface of the heavy equipment. The one or more brackets may connect to the surface of the equipment via one or more fasteners or mechanical connections. In such an embodiment, the kit may include the fasteners. The kit may include one or more signs or stickers positioned in the container and to be added to selected surfaces of the heavy equipment. The kit may include a diagram positioned in the container to indicate where to attach the one or more wire assemblies to the switch.

Another embodiment of the disclosure is transitory machine-readable storage medium storing processor-executable instructions that, when executed by at least one processor, cause the at least one processor to perform an operation or process. The instructions, when executed by the at least one processor, may detect a position of a lever of heavy equipment. The lever of the heavy equipment may be actuatable to an active position from an inactive position and to the inactive position from the active position. The instructions, when executed by the at least one processor, may, in response to detection of the lever when in the active position, (1) activate hydraulic operation controls of the equipment and (2) activate one or more indicators positioned on a surface of the equipment. The instructions, when executed by the at least one processor, may, in response to detection of the lever when in the inactive position, (1) prevent use of the hydraulic operation controls of the equipment and (2) de-activate one or more indicators positioned on a surface of the equipment.

Another embodiment of the disclosure is directed to a non-transitory machine-readable storage medium storing processor-executable instructions that, when executed by at least one processor, cause the at least one processor to perform an operation or process. The instructions, when executed by the at least one processor, may detect a position of a lever of heavy equipment, the lever of the heavy equipment actuatable to an active position from an inactive position and to the inactive position from the active position. The instructions, when executed by the at least one processor, may, in response to detection of the lever in the active position, (1) activate hydraulic operation controls of the heavy equipment and (2) activate a first state of one or more indicators positioned on one or more surfaces of the heavy equipment. The first state may comprise one or more of a first color of a light, activation of a first preselected or specified light, or emitting a specified sound. The instructions, when executed by the at least one processor, may, in response to detection of the lever in the inactive position, (1) prevent use of the hydraulic operation controls of the heavy equipment and (2) de-activate one or more indicators positioned on a surface of the heavy equipment. The instructions, when executed by the at least one processor, may, in response to detection of use of the heavy equipment, activate a second state of one or more indicators to indicate active use of the heavy equipment. The second state may comprise one or more of a second color of a light, activation of a second preselected or specified light, or emitting another specified sound.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other implementations, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 4A, FIG. 4B, FIG. 4C, FIG. 4D, FIG. 4E, and FIG. 4F are diagrams illustrating various portions of the heavy equipment, according to one or more embodiments of the disclosure.

DETAILED DESCRIPTION

Figure 1:
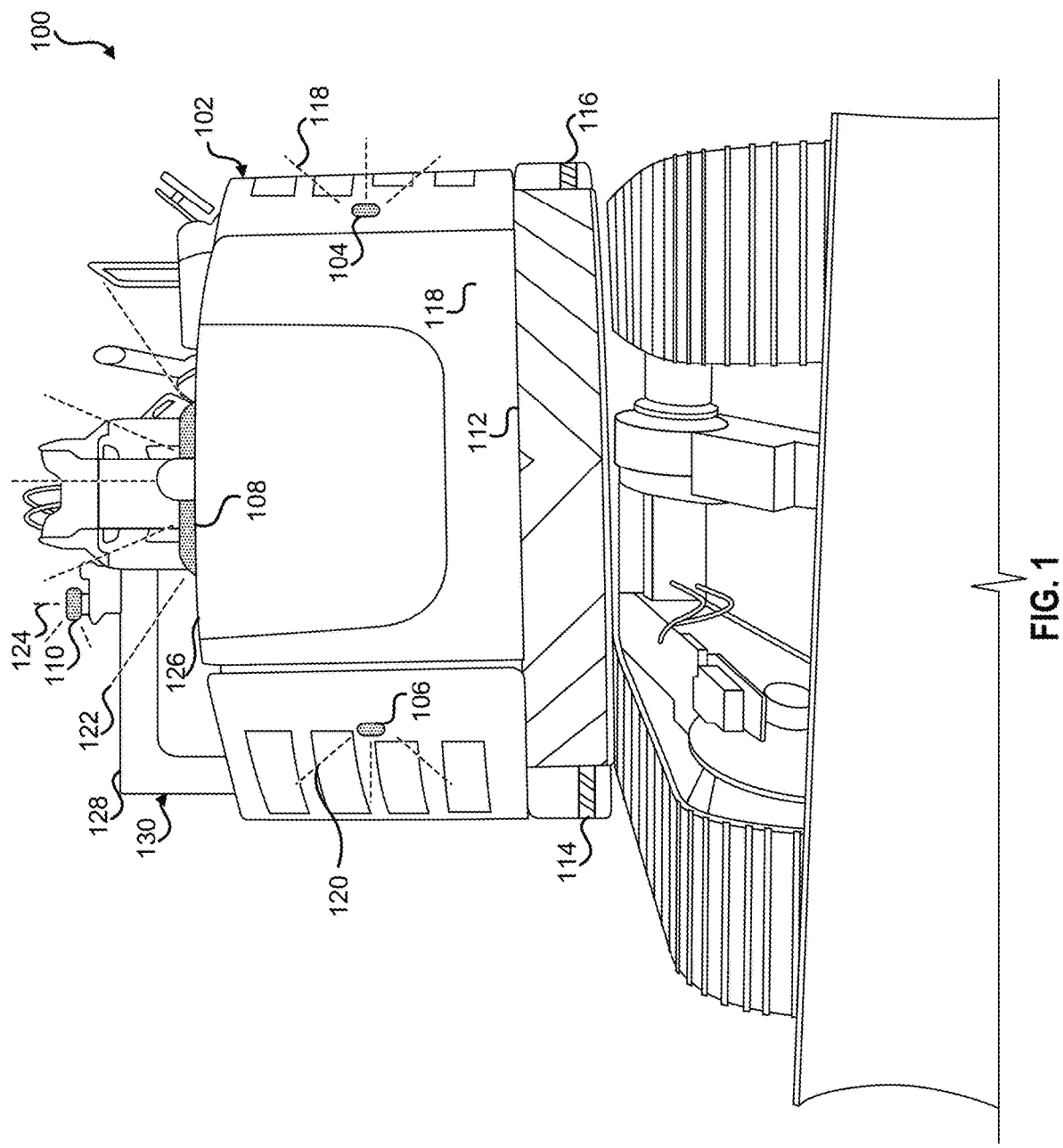
FIG. 1 is a diagram illustrating heavy equipment with one or more indicators, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure, as noted, is generally directed to systems and methods to activate one or more indicators, in addition to heavy equipment functionality and/or hydraulic functionality, via actuation of a lever or hydraulic initiation lever. The one or more indicators may warn or indicate (e.g., via light and/or sound) that heavy equipment is being operated, may be operated at any moment, or that hydraulic operations and/or equipment are enabled and ready for use. The one or more indicators may be included on, added to, installed on, positioned on, or mounted to various selected outer surfaces of heavy equipment. The locations of the outer surfaces where the one or more indicators are positioned may be selected based on visibility (e.g., some areas allow for more illumination and/or unobstructed views).

Each of the one or more indicators may connect to or may be connected to a conductor, a wire, a wire harness, or cable harness. The conductor, a wire, a wire harness, or cable harness may be passed through a compartment and/or engine compartment of the heavy equipment to the cabin or cab of the heavy equipment. An operator or user may remove the panel of a hydraulic operation control panel. The operator or user may connect the conductor, a wire, a wire harness, or cable harness to a switch or other component (e.g., an electrical or signal communication component) positioned inside the panel of the hydraulic operational control panel.

Once each indicator is connected to the switch or other component, the operator or user may replace or re-attach the panel. The hydraulic operational control panel may include a lever and/or an additional lever. The lever may be actuated to a locked and unlocked position and/or an active or inactive position. When an operator uses the heavy equipment, the operator may first power on the power source (e.g., a battery) and/or an engine of the heavy equipment. Once the heavy equipment is powered on, the operator may actuate the lever. Such actuation may cause the additional lever to move to a horizontal position from a vertical position to thereby prevent the operator from exiting the heavy equipment. Further, the heavy equipment and/or hydraulic functionality may be inoperable until the lever is actuated to the unlocked and/or active position. Once actuated, the hydraulics may be enabled and the one or more indicators may activate. Other states may be determined based on other aspects of the heavy equipment, such as actual use of the heavy equipment, actual use of hydraulic equipment, use of equipment actuated or moved by an engine, and/or actuation or placement of other parts of the heavy vehicle (e.g., seatbelt buckled, etc.).

As used herein, "heavy equipment" or "heavy equipment vehicle" may refer to machinery and/or vehicles designed to perform construction tasks, such as earth and/or road work operations or other construction related operations. In an embodiment, heavy equipment may be a heavy-duty vehicle, such as equipment or vehicle with a weight limit of twenty-six thousand pounds or more. However, other lighter machinery and/or vehicles may be considered heavy equipment regardless of weight limit. For example, a smaller backhoe may be considered heavy equipment, while having a weight limit less than twenty-six thousand pounds. Types of heavy equipment may include, but not be limited to, an excavator, a bulldozer, a backhoe, a trencher, a loader, a grader, a paver, a compactor, a crane, a telehandler, a feller buncher, pile boring equipment, pile driving equipment, or other heavy equipment configured to utilize hydraulics. The heavy equipment may utilize tracks and/or wheels to move.

FIG. 1 is a diagram illustrating heavy equipment with one or more indicators positioned or installed thereon, according to one or more embodiments of the disclosure. The system 100 may include a heavy equipment vehicle 102, also referred to as hydraulic heavy equipment or hydraulic-based heavy equipment. As illustrated, heavy equipment 102 is an excavator, the bucket and boom not shown, with a scoop attachment at the rear. Other types of heavy equipment may include the same, substantially the same, or similar placement of one or more indicators and the embodiment illustrated in FIG. 1 should not be considered limiting. The heavy equipment vehicle 102 may include an outer surface rear portion 118, an outer surface top portion 126 at the rear of the heavy equipment vehicle 102, and an outer surface top portion 128 of the cabin 130 of the heavy equipment vehicle 102. In such an embodiment, a first light 104 and a second light 106 may be disposed at or positioned on the outer surface rear portion 118 of the heavy equipment vehicle 102. The first light 104 and the second light 106 may shine light 118, 120 in an outwards and rearwards direction and/or, in some embodiments, to either side of the heavy equipment vehicle 102. A third light 108 may be positioned at the outer surface top portion 126 of the rear of the heavy equipment vehicle 102. The third light 108 may be a bar light or a strip light. Further, the third light 108 may be a directional light. In other words, the third light 108 may shine light 122 may shine in a direction that any of the light emitting diodes (LED) or other light emitting sources are facing, such as to the rear and both sides of the heavy equipment vehicle 102. In an embodiment, LEDs or other light emitting sources may be removed from portions of the third light 122 to prevent light from shining through the back window of the, thus preventing operator distraction and/or discomfort. A fourth light 110 may be positioned on an outer surface top portion 128 of the cabin 130 of the heavy equipment vehicle 102. The fourth light 110 may be a beacon. The beacon may provide constant light and/or a strobe effect. Further, light 124 from the fourth light 110 may shine in a 360-degree direction around the heavy equipment vehicle 102 (e.g., in front of, behind, and on both sides of the heavy equipment vehicle 102).

While specific embodiments of each light 104, 106, 108, 110 are described, it will be understood that other types of lights may be used for each light 104, 106, 108, 110, such as a strobe light, a directional light, a beacon, underglow lights, undercarriage lights, directional lights, or some combination thereof. Further, additional lights may be positioned on other outer surfaces of the heavy equipment vehicle 102 (e.g., underneath, on the sides, etc.). Further still, less lights may be positioned on the heavy equipment vehicle 102. For example, lights 106 and 104 may not be installed on the heavy equipment vehicle 102.

Each of the lights 104, 106, 108, 110 positioned on the heavy equipment 102 may be connected, via a conductor or a cable or wire harness, to a switch, controller, or other contact within a hydraulic control panel within the cabin 130 of the heavy equipment vehicle. Such a connection enables control of the lights 104, 106, 108, 110 based on various conditions (e.g., actuation of a lever which also enables hydraulic and/or other operation of the heavy equipment vehicle 102). Each of the lights 104, 106, 108, 110 may be, as noted, positioned or installed on an outer surface of the heavy equipment vehicle 102. In such embodiments, the lights 104, 106, 108, 110 may be connected or attached to an outer surface of the heavy equipment vehicle 102. Such an attachment or connection may be fixed or removable (e.g., fixedly or removable attached). For example, such attachment or connections may be achieved via a magnet, fastener, adhesive, a mechanical bond, or some combination thereof. For example, bolts and nuts may be utilized to mount a light to the outer surface and then the mount of the light may be welded in place. Warning stickers, decals, or other indicators 112, 114, 116 may be positioned on outer surfaces of the back and sides of the heavy equipment 102 to further warn of heavy equipment vehicle 102 operation.

Each of the lights 104, 106, 108, 110 may be configured to use a specific or pre-selected color and lumens to ensure visibility in many conditions (e.g., such as bright, dark, day, night, rain, mist, fog, and/or other environmental conditions). Further, such a configuration may be based on a distance that the lights 104, 106, 108, 110 may be visible from, e.g., 10 feet, 15 feet, 20 feet, 25 feet, 30 feet, or even more in any direction from the heavy equipment vehicle 102.

The lights 104, 106, 108, 110 may be off or de-activated when the heavy equipment vehicle 102 is powered off or when a corresponding lever within the heavy equipment vehicle to enable hydraulic operation of functionality of heavy vehicle 102 is in a locked or in-active position. When the lever is actuated to an unlocked or active position, the lights 104, 106, 108, 110 may receive power and/or a signal indicating that the lights 104, 106, 108, 110 may power on or activate. The lights 104, 106, 108, 110 may include other states that may be transitioned to, based on other actions or events.

Figure 2:
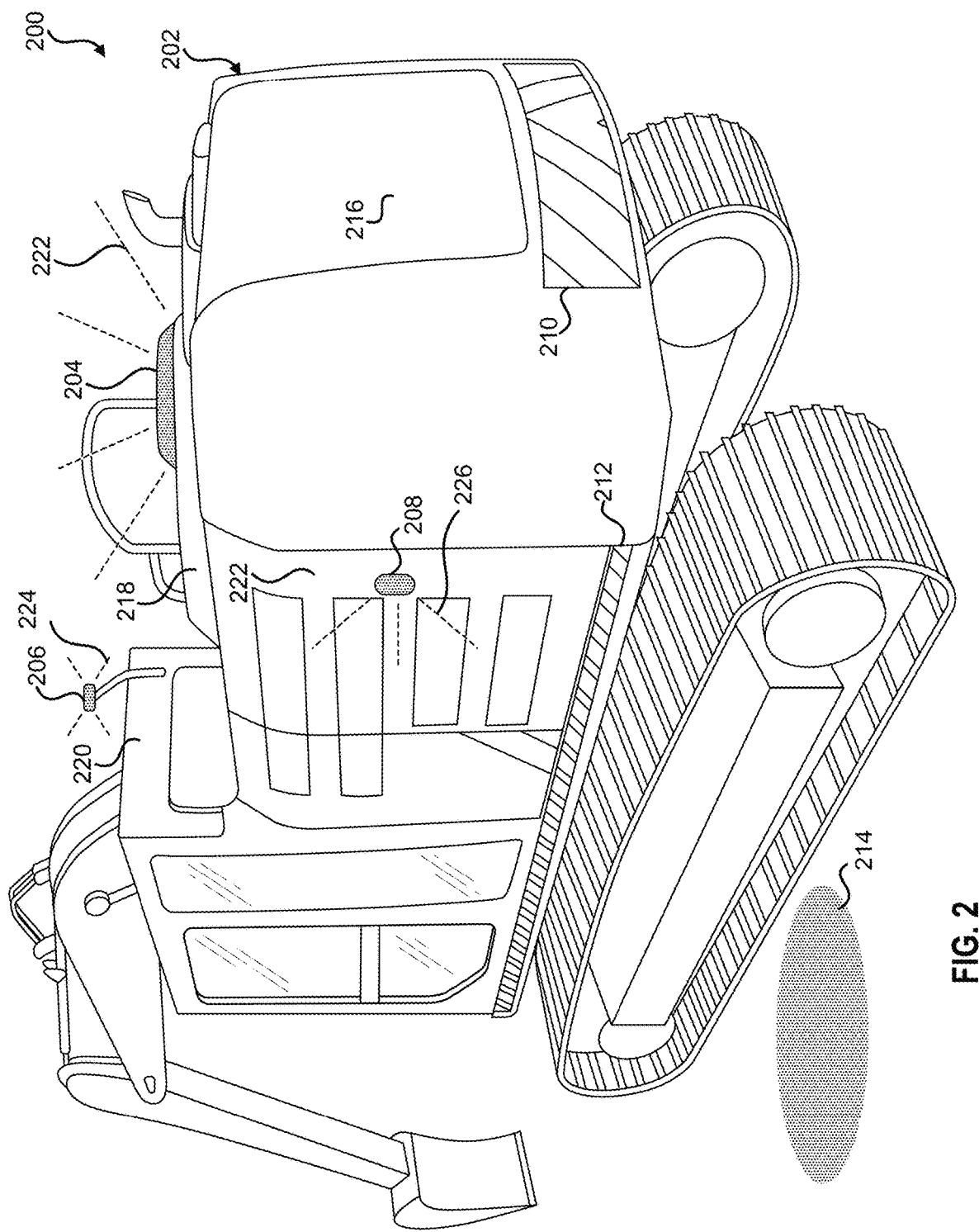
FIG. 2 is another diagram illustrating heavy equipment with one or more indicators, according to one or more embodiments of the disclosure.

FIG. 2 is another diagram illustrating heavy equipment with one or more indicators, according to one or more embodiments of the disclosure. Similar to FIG. 1, the heavy equipment of FIG. 2 may include one or more indicators (e.g., lights 204, 206, 208). As illustrated, a light 204 may be positioned or installed on the outer surface top portion 218 of the rear of the heavy equipment vehicle 202. Such a light 204 may shine light 222 to the rear 216 and sides of the heavy equipment vehicle 202. Another light 206 may be positioned at the outer surface rear portion of the cabin 220 of the heavy equipment vehicle 202. The light 206 may be mounted on a bracket allowing the light 206 to extend above the cabin 220, thus allowing 360 degree range of visibility of the light 224 in relation to the heavy equipment vehicle 202. Another light 208 may be positioned on the outer surface of the side 222 of the heavy equipment vehicle 202. A similar light may be positioned opposite light 208. Light 208 may shine light 226 towards the rear 216 and sides of the heavy equipment vehicle 202. In another embodiment, a light may be positioned or installed on an outer surface of the undercarriage of the heavy equipment vehicle 202. Light 214 from the undercarriage may illuminate the ground in a preselected proximity around or on one or more sides of the heavy equipment vehicle 202.

As noted, other indicators may be positioned or installed on the heavy equipment vehicle 202. For example, a speaker or other audio signal generation device may be positioned or installed at various portions of the heavy equipment vehicle 202. Such a speaker or other audio signal generation device may produce one or more sounds based on an input (e.g., actuation of a lever in the cabin 220, proximity of a person to the heavy equipment vehicle, use of the heavy equipment vehicle 202, and/or use of hydraulics of the heavy equipment vehicle 202). Other indicators may be positioned or installed on the heavy equipment vehicle 202, such as stickers, decals, or other indicators 210, 212.

Figure 3A:
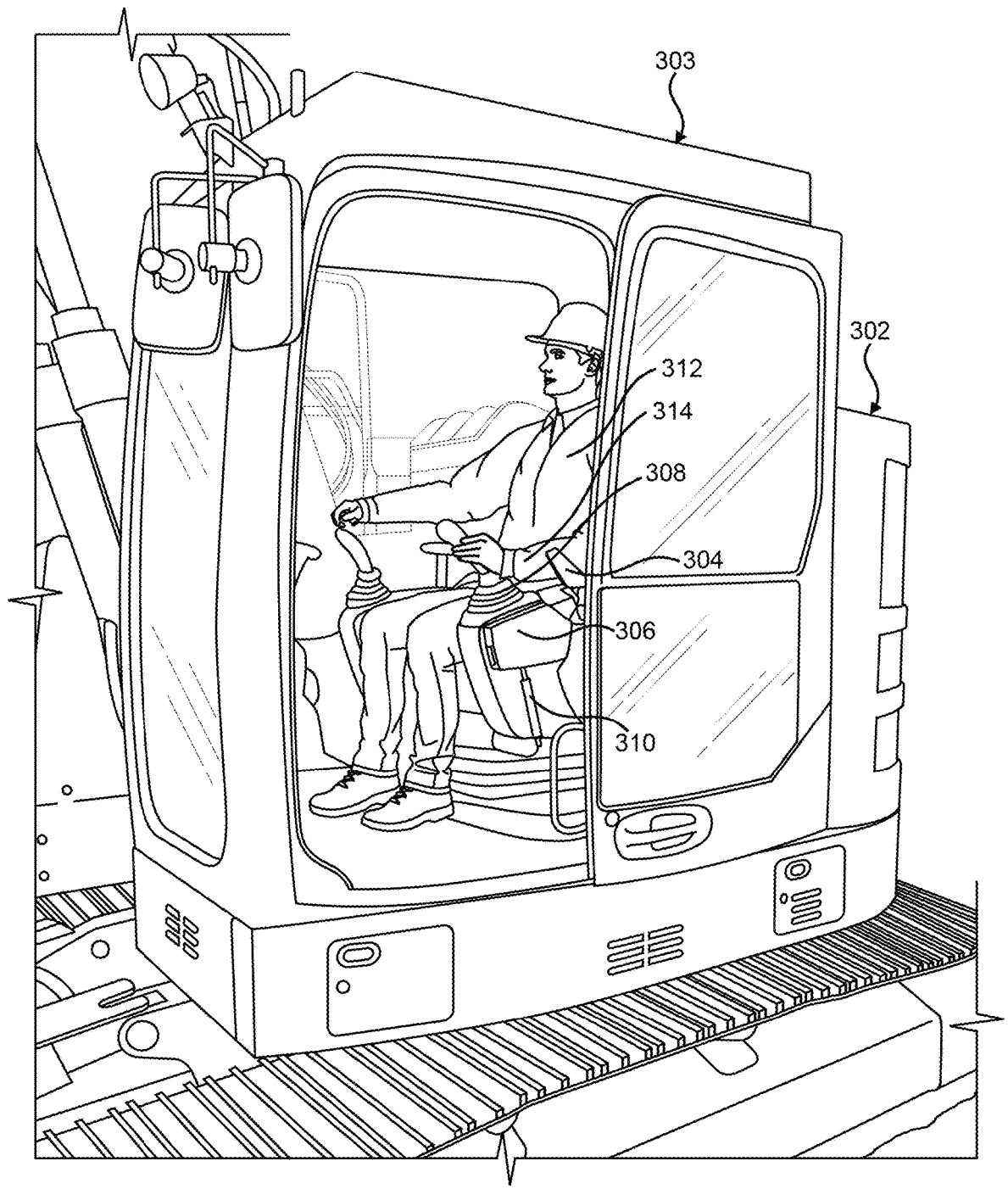
FIGS. 3A and 3B are diagrams illustrating an interior of a cabin of the heavy equipment, according to one or more embodiments of the disclosure.
Figure 3B:
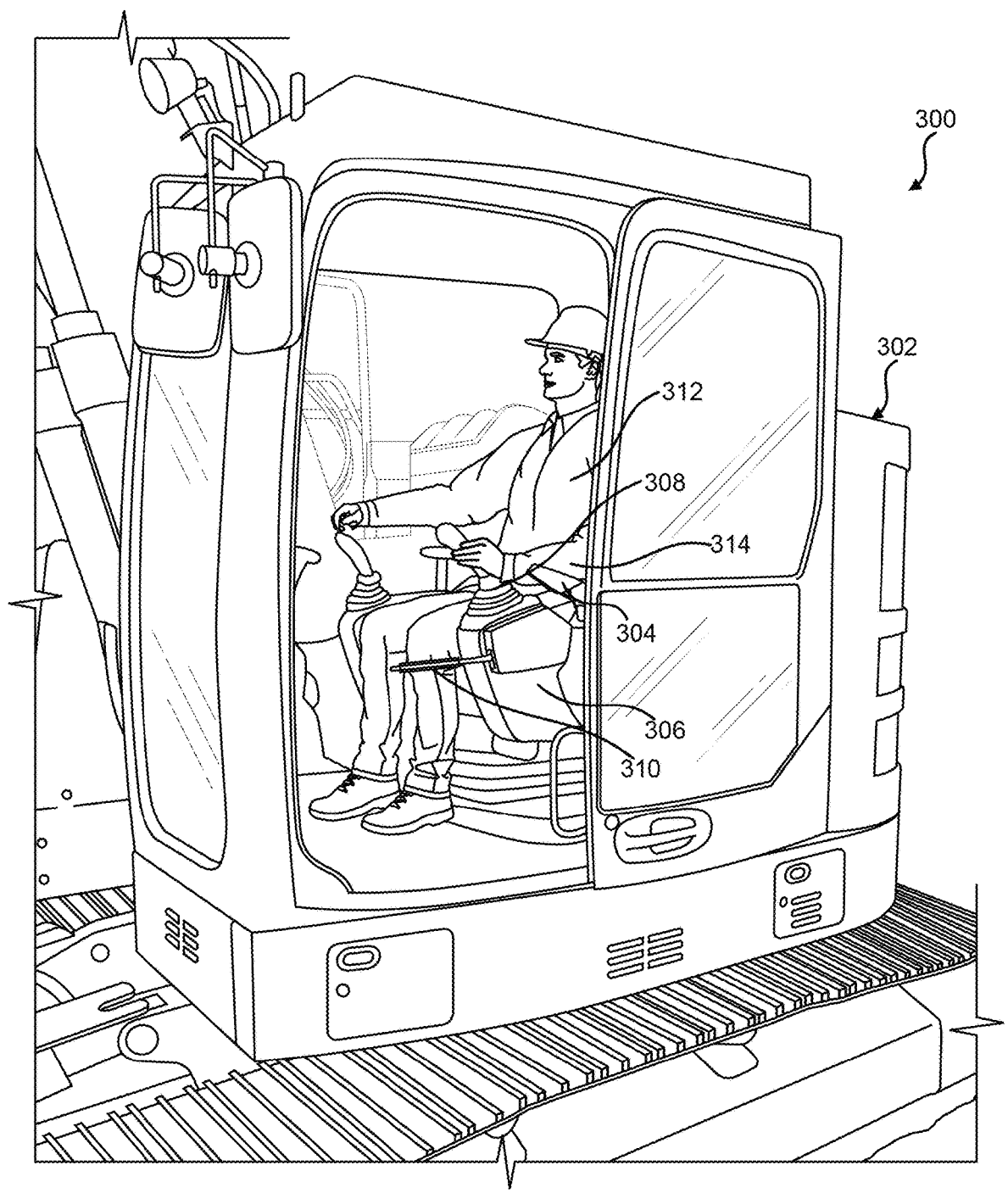

FIGS. 3A and 3B are diagrams illustrating an interior of a cabin of the heavy equipment, according to one or more embodiments of the disclosure. A hydraulic operations control panel 306 may be positioned within the interior of the cabin 303 of the heavy equipment vehicle 302. The hydraulic operation controls 308 or a joystick may be positioned on the hydraulic operations control panel 306. A lever 304, also referred to as warning initiation lever, a hydraulic initiation lever, a warning and hydraulic initiation lever, etc., may be positioned on the hydraulic operations control panel 306 and proximate the hydraulic operation controls 308 to allow an operator 312 to enable or disable (e.g., based on position of the lever 304) the hydraulic operation controls and one or more indicators and/or other functionality of the heavy equipment vehicle 302. The operator 312 may, prior to all operation and/or hydraulic operation of the heavy equipment vehicle 302, actuate the lever 304, thus enabling hydraulic operations and the one or more indicators. The lever 304 and hydraulic operation controls 308 may be within proximity of the operator's arm/reach 314. Thus, the operator 312 may disable or prevent operation of the heavy equipment vehicle 302 at any time or moment (e.g., lifting the lever 304, as illustrated in FIG. 3A). Further, when the user actuates the lever 304 (e.g., push down the lever 304, as shown in FIG. 3B), another lever 310 may be actuated to thereby cause lever 310 to move to a horizontal position. Thus, the other lever 310 may prevent the operator from exiting the heavy equipment vehicle 302 during operation.

In an embodiment, rather than a lever 304, a switch, knob, or other component configured to actuate may be positioned on the hydraulic operation control panel to enable/disable hydraulic operations and/or the one or more indicators.

Figure 4A:
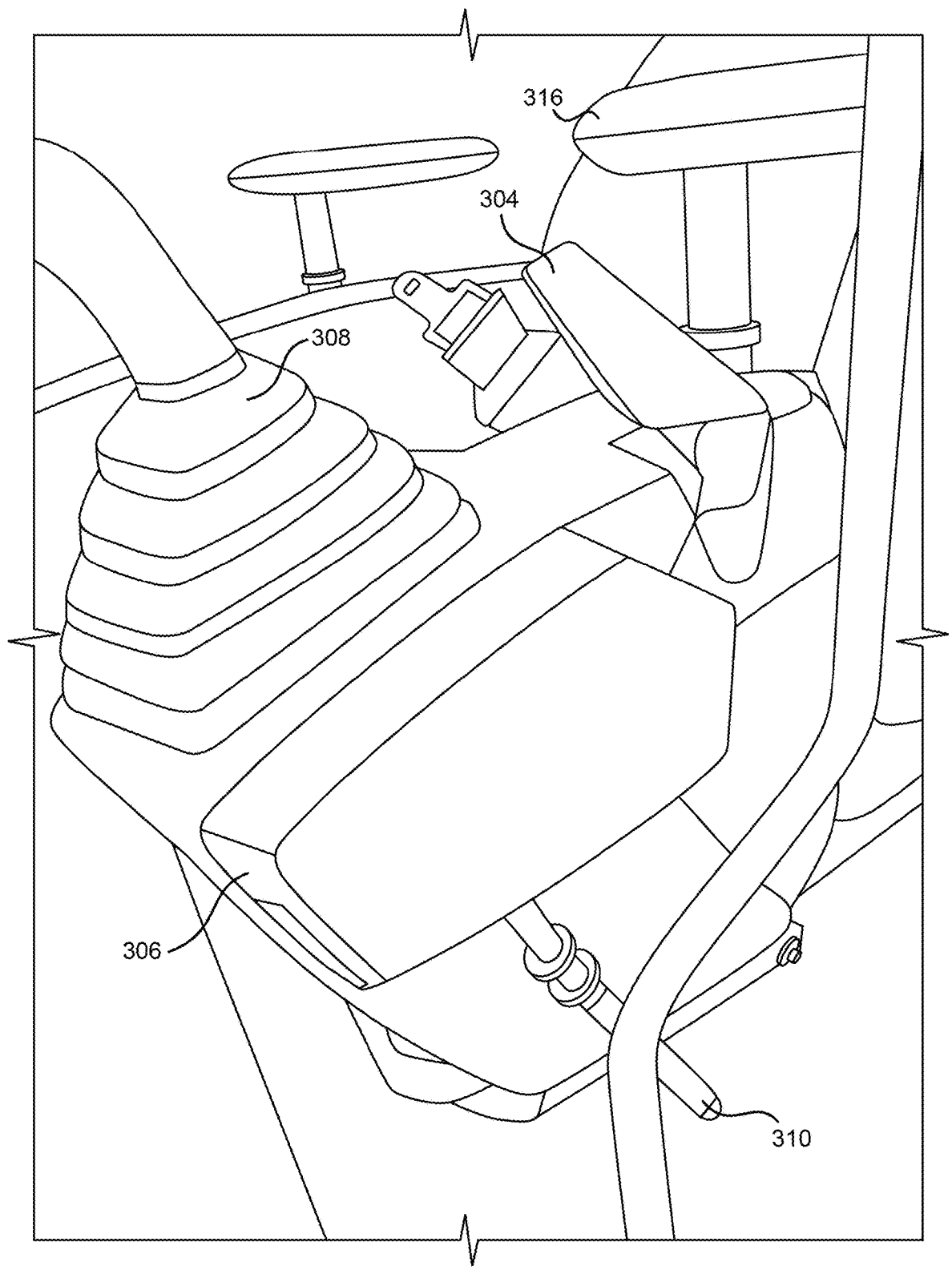
Figure 4B:
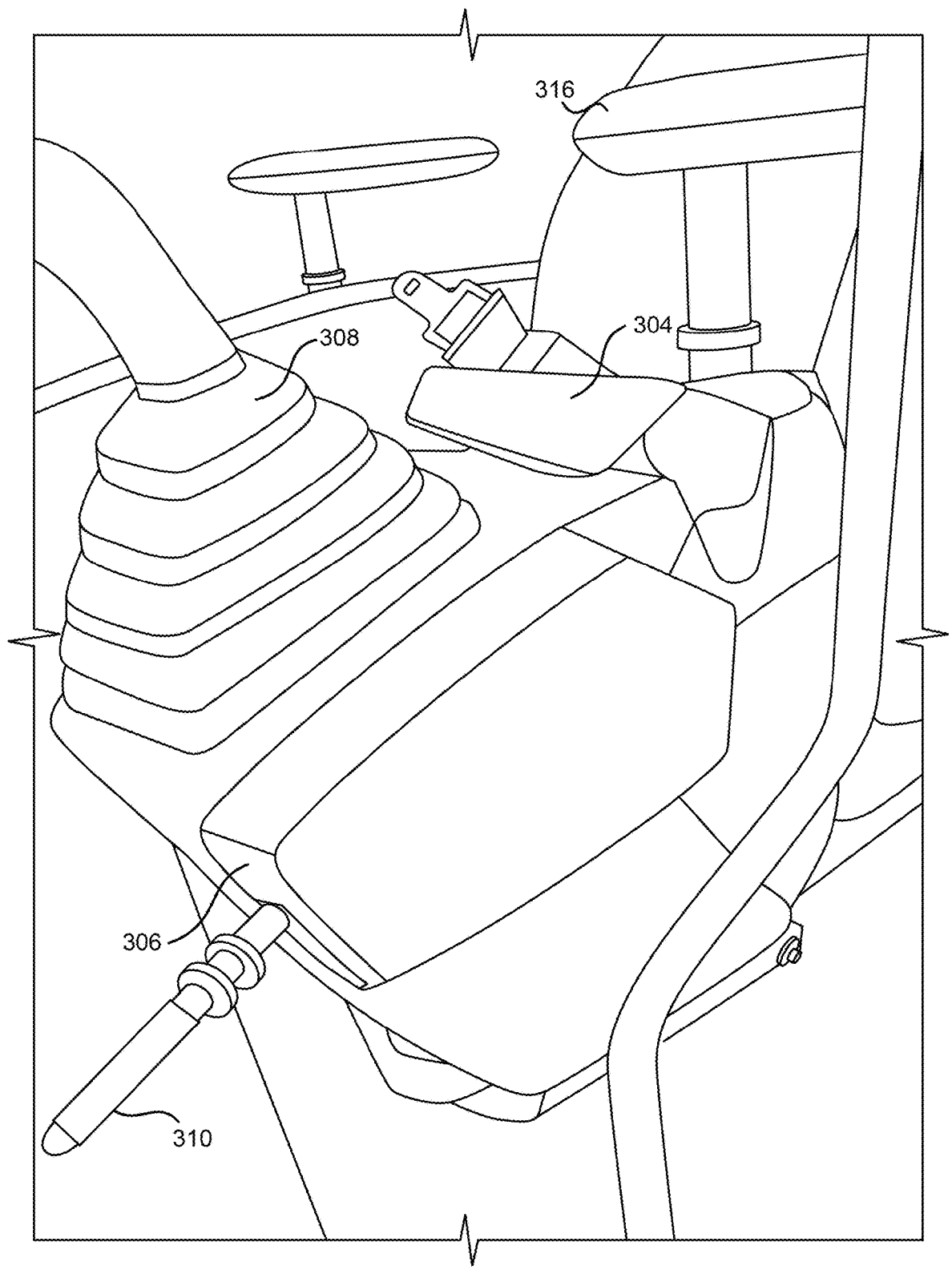

FIG. 4A, FIG. 4B, FIG. 4C, FIG. 4D, FIG. 4E, and FIG. 4F are diagrams illustrating portions of the heavy equipment, according to one or more embodiments of the disclosure. As shown, and noted, the system may include the lever 304 and hydraulic operation controls 308 positioned on a hydraulic operation control panel 306 and proximate an armrest 316. In FIG. 4A, the lever 304 may be lifted to an inactive or locked position thereby preventing use of the hydraulic equipment and/or all functionality of the hydraulic equipment. In FIG. 4B, the lever 304 may be pushed down to an active or unlocked position thereby enabling hydraulic operations of the control panel (e.g., by creating a circuit between a power source and the hydraulic operation controls) and activating the one or more indicators (e.g., by, in one example, creating a circuit between the power source and each of the one or more indicators). The actuatable lever may cause the other lever to move to a horizontal position or a vertical position.

Figure 4D:
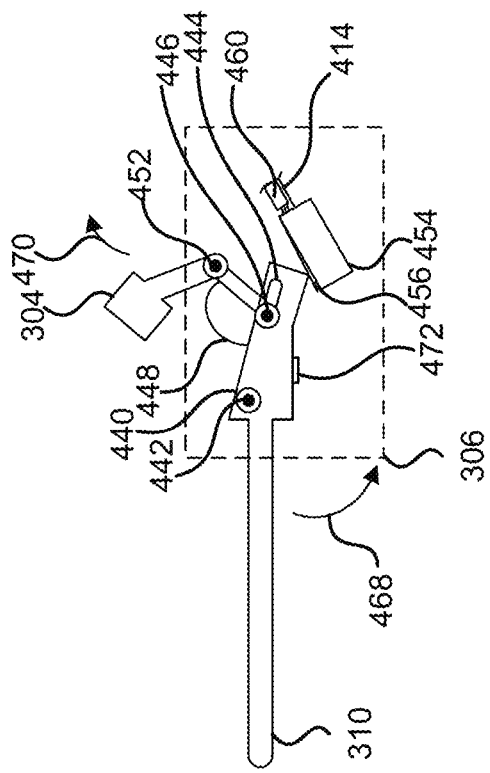
Figure 4C:
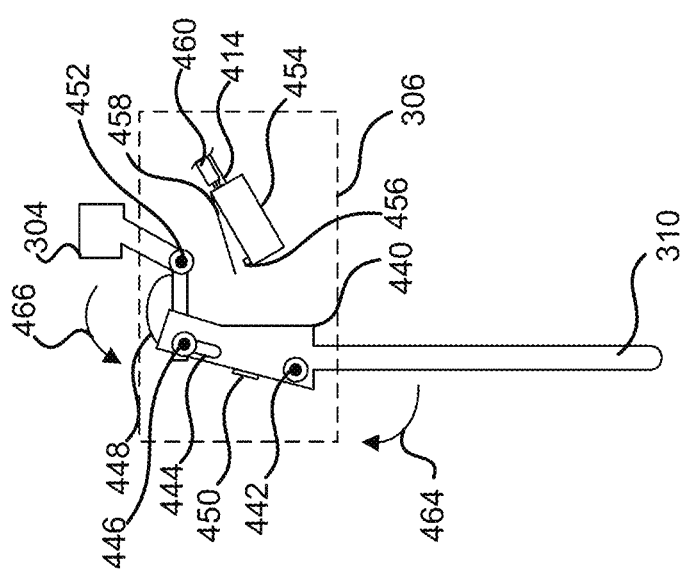
Figure 4E:
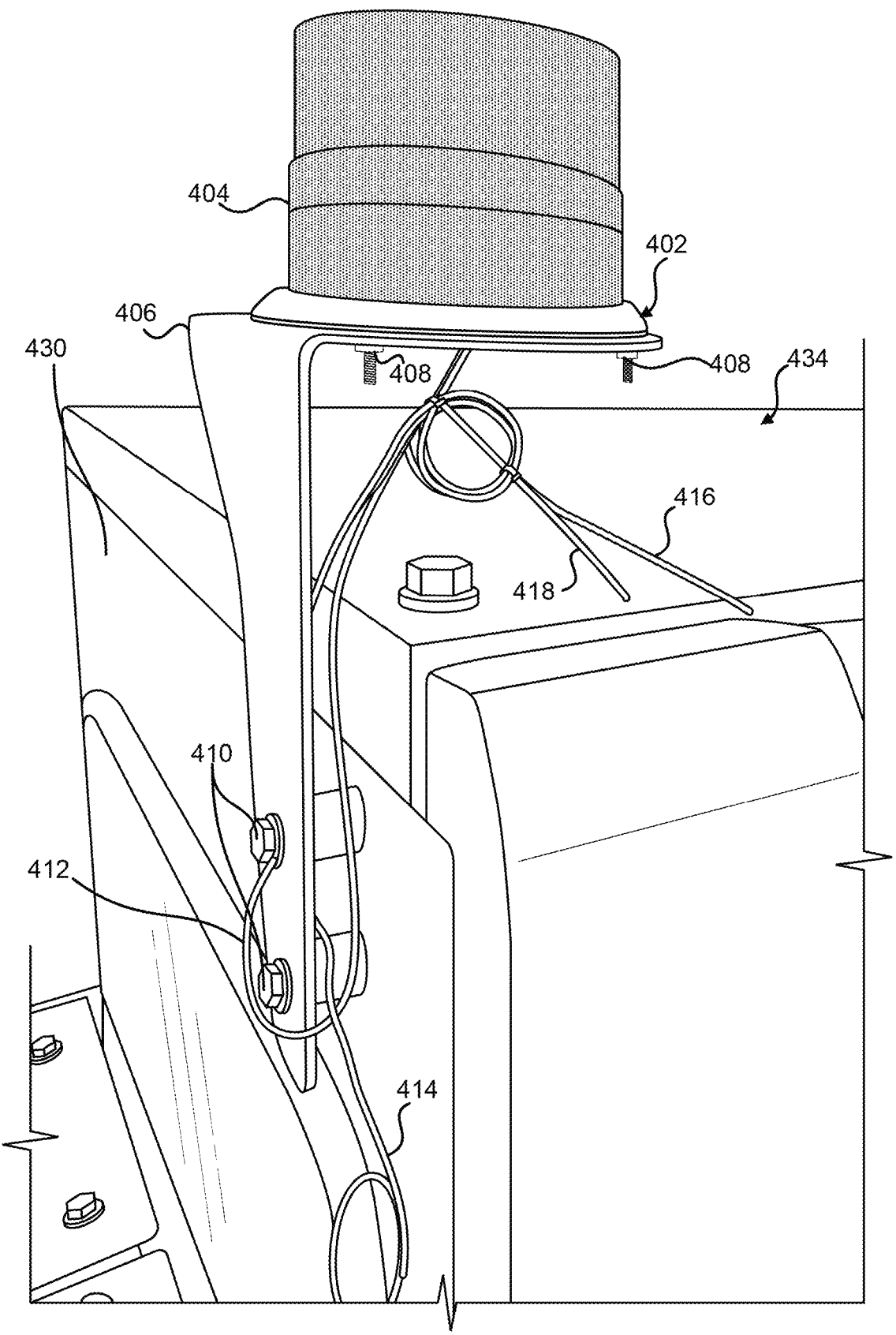

Turning to FIGS. 4C and 4D, an internal view of the hydraulic operation control panel is shown. The lever 304 may be attached to a portion of and/or the inside of the hydraulic operation control panel 306 via a pin or other fastener 452. The pin or other fastener 452 may be fixed and the lever 304 may pivot about the pin or fastener 452. The lever 304 may connect to an upper portion of the other lever 310 via a cam 444 and follower 448 (e.g., another fastener or pin). A stop 450 and a spring 448 (e.g., a torsion spring) may be included to prevent the other lever 310 from moving past the vertical position as shown in FIG. 4C. As the lever 304 pushes forward in direction 466 the cam 444 and follower 446 may force the other lever 310 in direction 464 to cause the lever 310 into a horizontal position as shown in FIG. 4D. The torsion spring 448 may additionally keep the other lever 310 in the horizontal position. A second stop 472 may be included to prevent the other lever 310 from moving past a certain position when in the horizontal position. The one or more indicators and the hydraulic operation controls 308 may be connected, via a conductor or wire harness 414, 460, to switch 454. The switch 454 may further be connected to a power source. As the lever 310 pushes on the bar 458 (e.g., a flat, thin, and rigid bar or sheet), a button or protrusion 456 may be depressed. As the button or protrusion 456 is depressed, the switch 454 may create a circuit between the hydraulic operation controls 308 and the power source and may create a circuit between the power source and the one or more indicators. In another embodiment, other components or devices may be included. The other components or devices may generate signals to cause power to flow to the hydraulic operation controls and indicator when the lever 304 is actuated. The signal may be a constant signal. The signal may be a bit or a voltage sufficient to power the one or more indicators and/to the hydraulic operation controls 308.

As noted, the lights or other indicators may be positioned on various outer surfaces of the heavy equipment. For example, a light 404 may be positioned over the top of a cabin 434 of the heavy equipment vehicle. The light 404 may attach to a bracket 406, for example via screws or bolts and nuts 408. The bracket 406 may connect to the back outer surface 430 of the cabin 434 of the heavy equipment vehicle via bolts and nuts 410 or other fasteners. Such a connection may also be fixed (e.g., welded, etc.). The light 404 may include or may connect to one or more conductors or wires 412, 414, 416, 418. Each conductor or wire 412, 414, 416, 418 may be configured to carry a particular signal to the light 404. For example, 412 is a ground conductor or wire and may connect the light 404 to ground. Conductor or wire 414 may provide power or a signal to activate (e.g., if the light 404 includes a separate power source) to the light 404. Other conductors or wires 416, 418 may be included to offer different functionality. For example, the conductors or wires 416, 418, when receiving a specified signal (e.g., a bit or series of bits), may cause the light to alter the operational state. For example, the light may change color, change from strobe/solid to solid/strobe light, and/or alter the frequency of the strobe, among other updates.

In another embodiment and as illustrated in FIG. 4F, light 420 may be positioned on the outer surface top portion 436 of the rear of the heavy equipment. The light 420 may be a bar or strip light. The light 420 may include a series or number of LEDs 422, 424. In an example, the LEDs typically located at the back of the light 420 may be removed to prevent the light from shining into the cabin of the heavy equipment. The connection of the light to the outer surface top portion 436 of the heavy equipment vehicle may be via a fastener 428 through a mounting portion 426 of the light (as illustrated), via a mechanical bond, and/or via other types of connections.

Figure 5A:
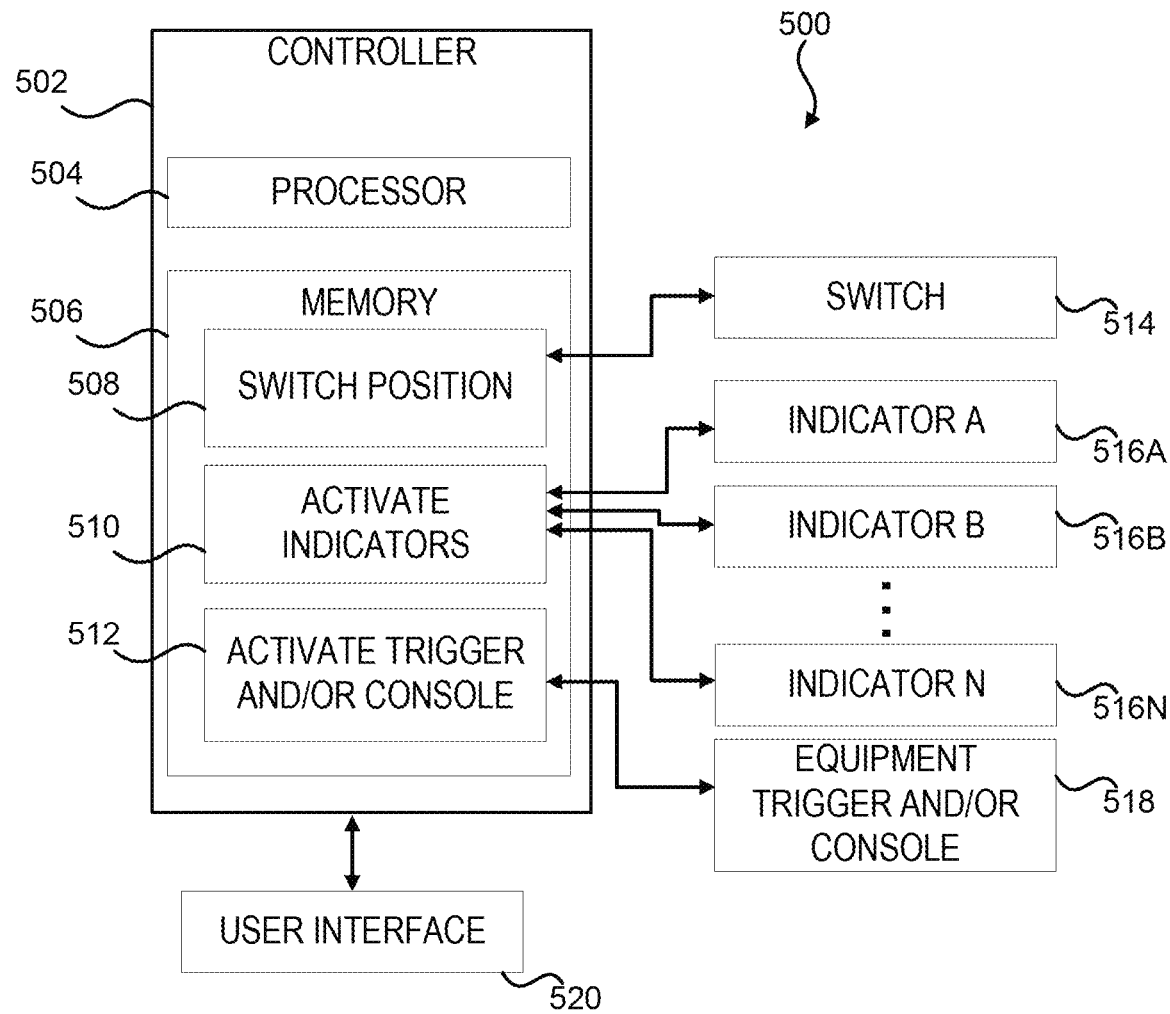
FIG. 5A and FIG. 5B are simplified diagrams illustrating a control system for activating one or more indicators and hydraulic operations, according to one or more embodiments of the disclosure.
Figure 5B:
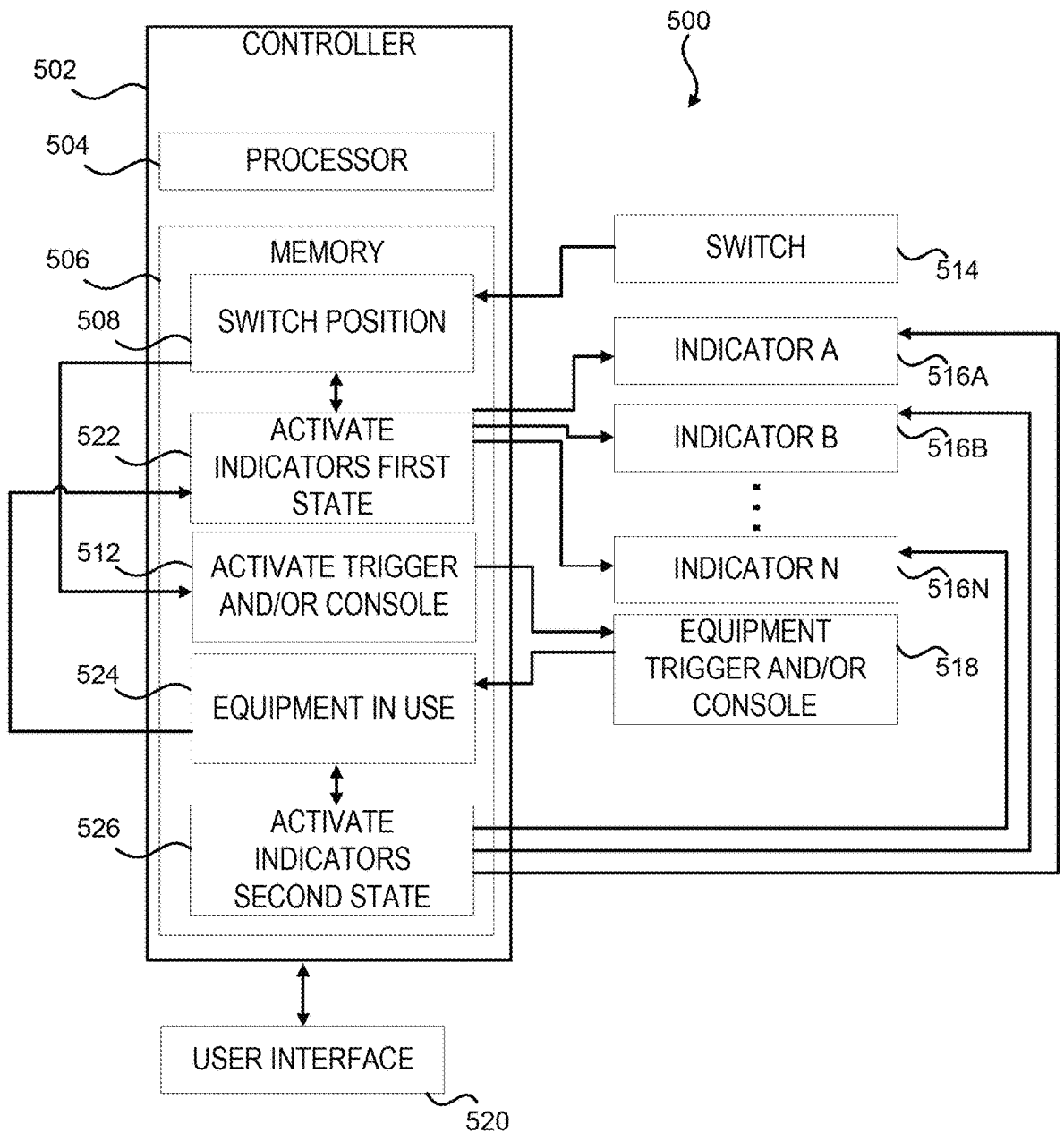

FIG. 5A and FIG. 5B are simplified diagrams illustrating a control system for activating one or more indicators and hydraulic equipment, according to one or more embodiments of the disclosure. A controller 502 may manage operation of the indicators and other aspects of the system 500. The controller 502 may be one or more controllers, a supervisory controller, programmable logic controller (PLC), a computing device (such as a laptop, desktop computing device, and/or a server), an edge server, a cloud based computing device, a user interface and/or computing device of the heavy equipment, and/or other suitable devices. The controller 502 may be located at or near the hydraulic operation control panel. The controller 502 may be located remote from the hydraulic operation control panel. The controller 502, as noted, may be more than one controller. The controller 502 may include a processor 504, or one or more processors, and memory 506. The memory 506 may include instructions. In an example, the memory 506 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 506 may store or include instructions executable by the processor 504. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

As noted, the controller 502 may include instructions executable by processor 504. The instruction may include instructions 508 to determine a switch 514 position. In an embodiment, the switch 514 may be a depression switch or other type of electro-mechanical switch. The controller 502, in such examples, may receive an indication that the switch 514 is depressed. When the controller 502 is not receiving such a signal, the controller 500 may determine that the switch is not depressed. As noted, other types of switches or electro-mechanical switches may be utilized. In another embodiment, the controller 502 may determine a lever position, rather than or in addition to switch position. In such examples, the controller 502 may receive an indication of position (e.g., active and inactive and/or unlocked and locked) from the lever itself or from an associated device. In an embodiment, such signals may be utilized to either determine switch position and/or the lever positon.

The controller 502 may include instructions 510 to activate indicators 516A, 516B, and up to 516N based on switch position or, in other embodiments, lever position or some other event or signal. In response to reception of a signal indicating or determination that the switch 514 is depressed and/or that the lever is in an active or unlocked position, the controller 502 may activate or transmit a signal to cause activation of the indicators 516A, 516B, 516N. In another embodiment, the position of the switch 514 may cause power to flow to the indicators 516A, 516B, 516N, the power activating the indicators 516A, 516B, 516N (e.g., via creation of a circuit between a power source and the indicators 516A, 516B, 516N).

The controller 502 may include instructions 512 to activate a trigger and/or console 518 (e.g., hydraulic operation controls). The controller 502 may, in response to reception of a signal indicating or determination that the switch is depressed and/or that the lever is in an active or unlocked position, activate or transmit a signal to cause activation of the trigger and/or console 518.

In another embodiment, the controller 502, as illustrated in FIG. 5B may include additional instructions. The controller 502 may include instructions to activate an indicators' 516A, 516B, 516N first state. In an embodiment, the one or more indicators 516A, 516B, 516N may be configured to exhibit or have a plurality of states and to switch from one state to another based on one or more events or actions. For example, a first state may include illuminating a light of a first color based on a first signal and a second state may include illuminating a light of a second color based on a second signal. The indicators 516A, 516B, 516N, in relation to FIG. 5B, may transition to a first state based on a switch position or lever position. In other words, the controller 502 may determine the position of the switch or lever and, based on that position, transmit a corresponding signal to the indicators 516A, 516B, 516N.

In an embodiment, the controller 502 may include instructions 524 to determine whether the heavy equipment and/or whether hydraulics of the heavy equipment is in use. The controller 502, in such embodiments, may receive a signal from the heavy equipment (e.g., via a console, dashboard, or other internal component of the heavy equipment). Based on the signal the received, the controller 502 may determine whether and how the heavy equipment vehicle is in use (e.g., powered on, hydraulics active, hydraulics in use, etc.).

The controller 502 may include instructions 526 to transition the indicators 516A, 516B, 516N to a second state based on the determination that the heavy equipment vehicle is in use. In an embodiment, the controller 502 may transmit a signal to the indicators 516A, 516B, 516N to indicate and/or cause such a transition. In an embodiment, the transition may include changing the color of a light, emitting a sound, or some other indication. If the heavy equipment is not in use, the controller 502 may transmit a signal to transition back to the first state. Thus personnel and/or other users may be sufficiently warned when the heavy equipment is in a first state (e.g., hydraulics enabled) and a second (e.g., hydraulics actively being utilized). In another embodiment, two states may be signaled by the controller 502: a first state to indicate that the heavy equipment is powered on and a second state to indicate that the hydraulics are enabled. In yet another embodiment, a third state may be signaled by the controller 502 to indicate that the hydraulics are actively being utilized.

Figure 6:
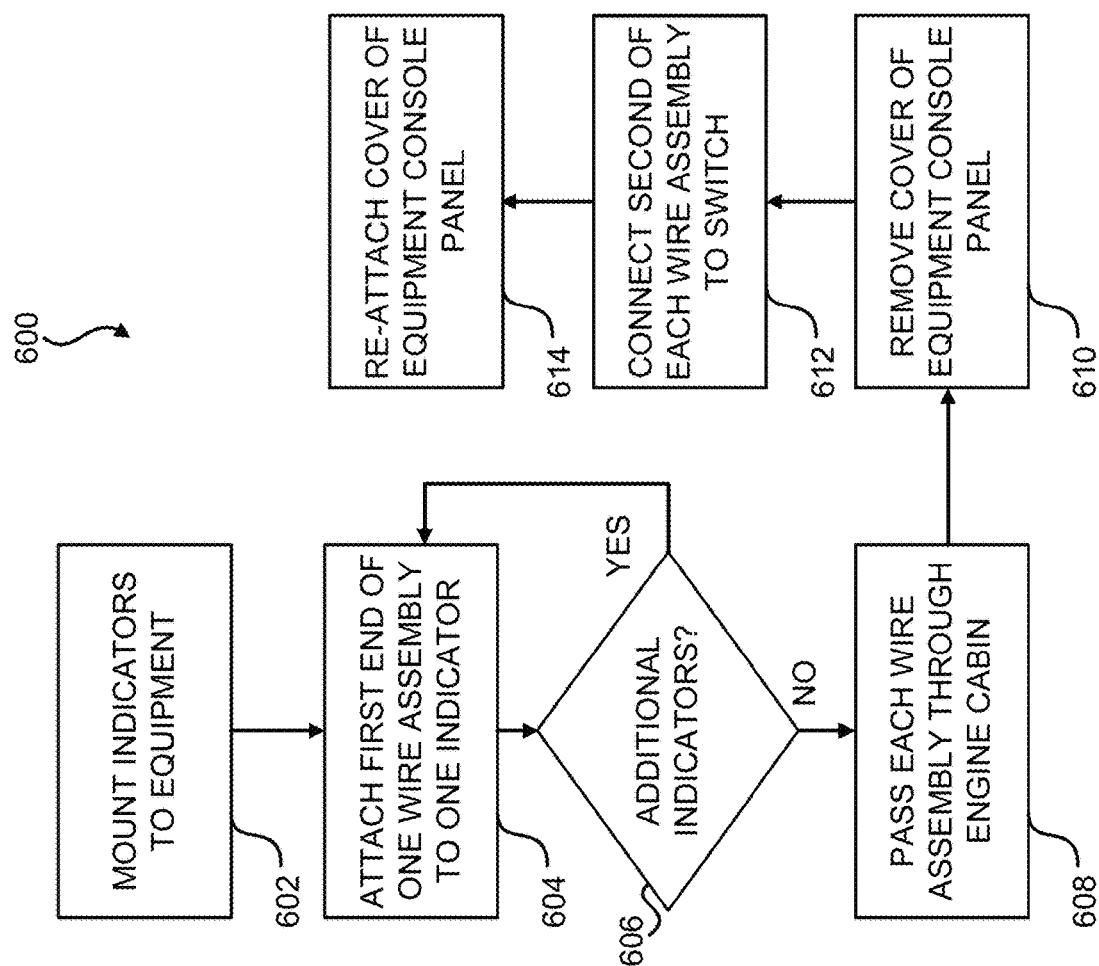
FIG. 6 is a flow diagram for installing a kit, according to one or more embodiments of the disclosure.

FIG. 6 is a flow diagram for installing a kit, according to one or more embodiments of the disclosure. The order in which the operations are described is not intended to be construed as a limitation, and any number of the described blocks may be combined in any order and/or in parallel to implement the disclosed methods.

At block 602, an operator or installer may mount indicators to heavy equipment. The operator may mount the indicators to an outer surface of the heavy equipment based on visibility. In another embodiment, the indicators may be included in a kit and the kit may include diagrams and/or schematics. The operator may utilize the schematics or diagrams to mount the indicators to the equipment. The operator may utilize fasteners and/or mechanical bonds to attach or connect the indicator to the outer surface of the heavy equipment.

Once each indicator has been mounted to the heavy equipment, at block 604, the operator may attach a first end of a wire harness or assembly to one of the one or more indicators. The wire harness or assembly may include a connector corresponding to a connector disposed on the indicator. In another embodiment, the wire harness or assembly may be pre-connected to the indicators. At block 606, the operator may check for additional indicators or determine whether additional indicators do not include a wire harness or assembly. If an indicator does not include a connected wire harness or assembly, then the operator may attach another wire harness or assembly to such an indicator.

At block 608, the operator may pass the wire harnesses or assemblies through the engine cabin or other compartment to an operator's cabin. Prior to such a process, the operator may bundle each wire harness or assembly together. At block 610, the operator may remove the cover of the equipment console panel or hydraulic operation console panel. At block 612, the operator may connect the second end of each wire harness or assembly to the switch. At block 614, the operator may re-attach the cover of the equipment console panel.

Figure 7:
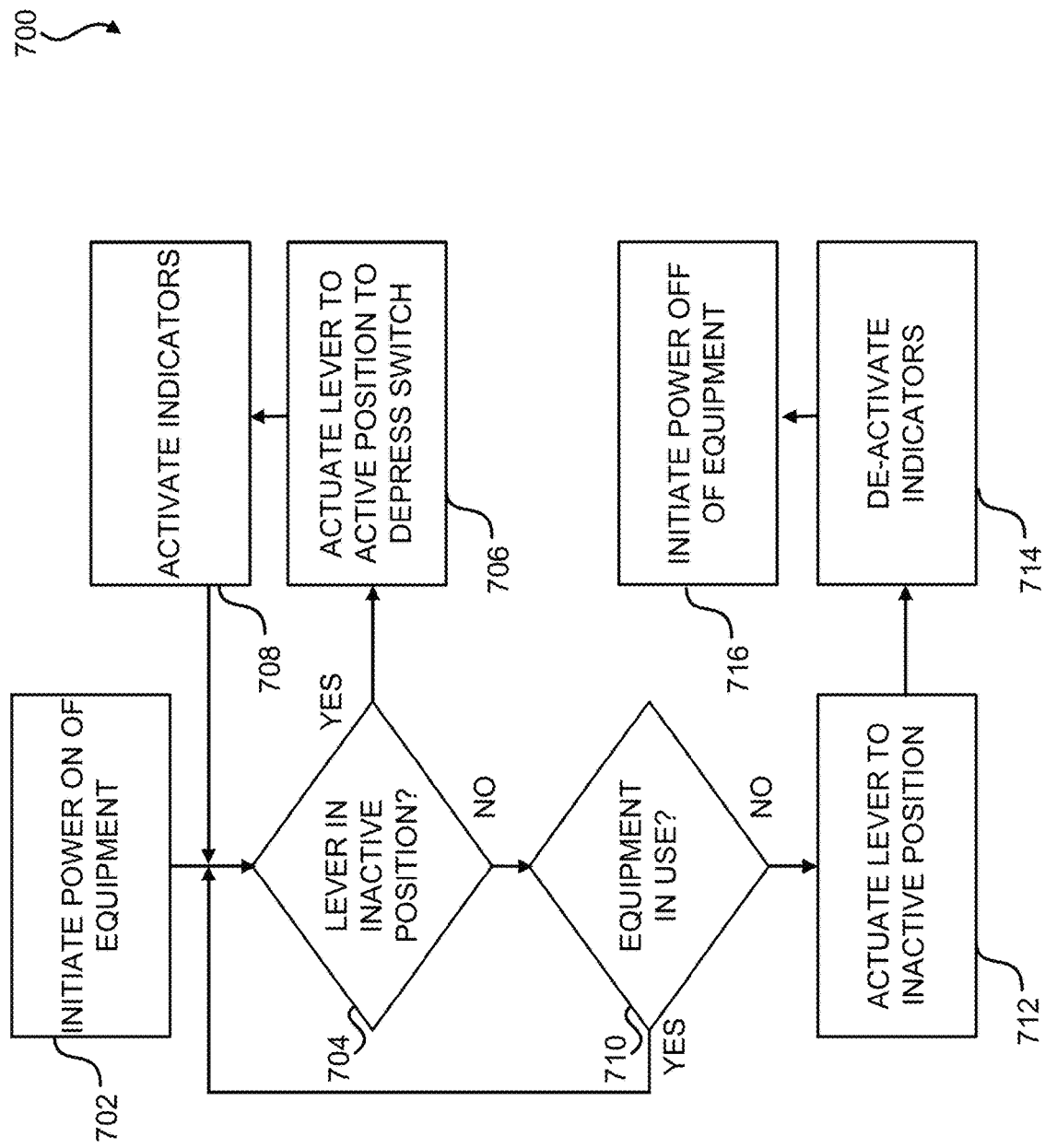
FIG. 7 is a flow diagram for utilizing the one or more indicators, according to one or more embodiments of the disclosure.

FIG. 7 is a flow diagram for utilizing the one or more indicators, according to one or more embodiments of the disclosure. Heavy equipment and associated components of FIGS. 1-5B may utilize method 700. Further, method 700 may be included in one or more programs, protocols, or instructions loaded into memory of a computing device or controller 502 or may be utilized by one or more users. The order in which the operations are described is not intended to be construed as a limitation, and any number of the described blocks may be combined in any order and/or in parallel to implement the disclosed methods.

At block 702, power for the equipment may be initiated. The power may be initiated by a controller in response to reception of a power on signal. The power on signal may be generated by an operator depressing a power button or switch or turning a key in an ignition.

At block 704, a controller and/or operator may determine whether the lever is in an inactive or locked position. In an embodiment, the lever being in an inactive or locked state may generate a signal indicating such a state. In another embodiment, the lever being in an active or unlocked state may generate a signal, while the inactive or locked state does not generate a signal, e.g., thus the absence of a signal may indicate an inactive or locked position of the lever. If the lever is in an inactive or locked position, then an operator may actuate the lever, at block 706, to an active or unlocked position. Such an action, at block 708, may generate a signal, for example at the controller or at another component, to activate one or more indicators. In another embodiment, such an action may depress or transition states of a switch. In either example, such actions may create a circuit between a power source and the one or more indicators and a circuit between the power source and hydraulic operation controls. Thus, an operator may be able to operate the heavy equipment and the indicators may warn proximate personnel and other users that the heavy equipment is active.

At block 710, the controller or an operator may determine whether the equipment is still in use. In an embodiment, the controller may determine whether the heavy equipment has been idle for a pre-selected period of time. If the heavy equipment has been idle for such a period of time, the controller may determine that the heavy equipment is no longer in use. In another embodiment, the operator may determine that a particular operation is complete and that the equipment is no longer being utilized. If the equipment is still in use, the controller or operator may again determine whether the lever is in an inactive position at block 704.

At block 712, if the equipment is not in use, the lever may be actuated to an inactive or locked position. At block 714, the controller may de-activate the indicators. In another embodiment, the action of actuating the lever may break a circuit between the indicators and power source, thus de-activating the indicators. At block 716, the heavy equipment may be powered off.

Figure 8B:
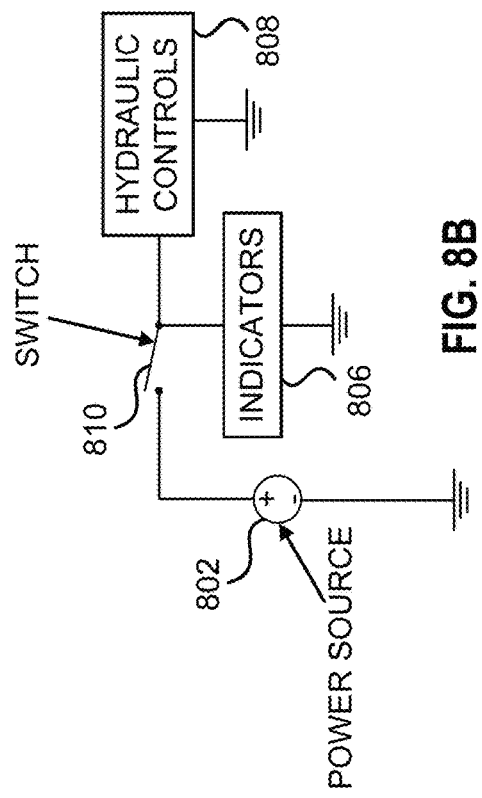
FIG. 8A and FIG. 8B are simplified diagrams illustrating a system for activating one or more indicators and hydraulic operations and/or equipment, according to one or more embodiments of the disclosure.
Figure 8A:
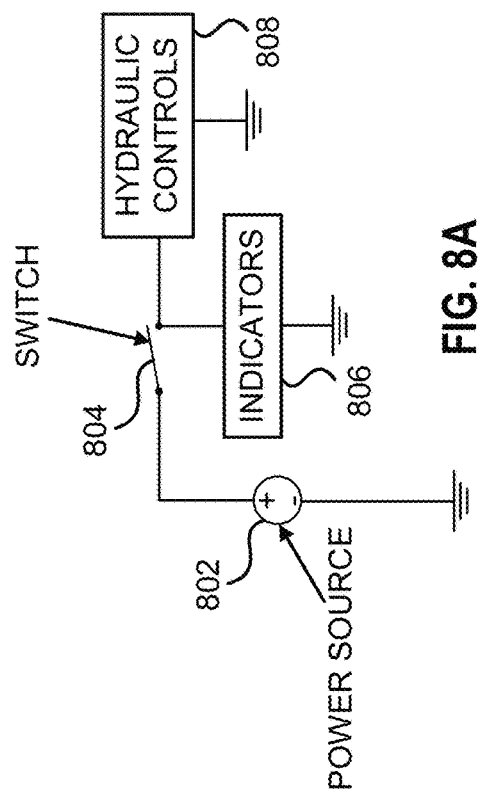

FIG. 8A and FIG. 8B are simplified diagrams illustrating a system for activating one or more indicators and hydraulic equipment, according to one or more embodiments of the disclosure. The system may include a power source 802, a switch 804, one or more indicators 806, and hydraulic controls 808. As described above, when a lever is actuated to an active or unlocked state, the lever (e.g., or other component) may cause a switch 804 to be closed. Closure of the switch 804 may cause power to flow to the one or more indicators 806 and hydraulic controls 808. When the lever is actuated to an inactive or locked state, the switch 804 may open, thus breaking the circuit and preventing power from flowing to the one or more indicator 806 and the hydraulic controls 808.

Figure 9:
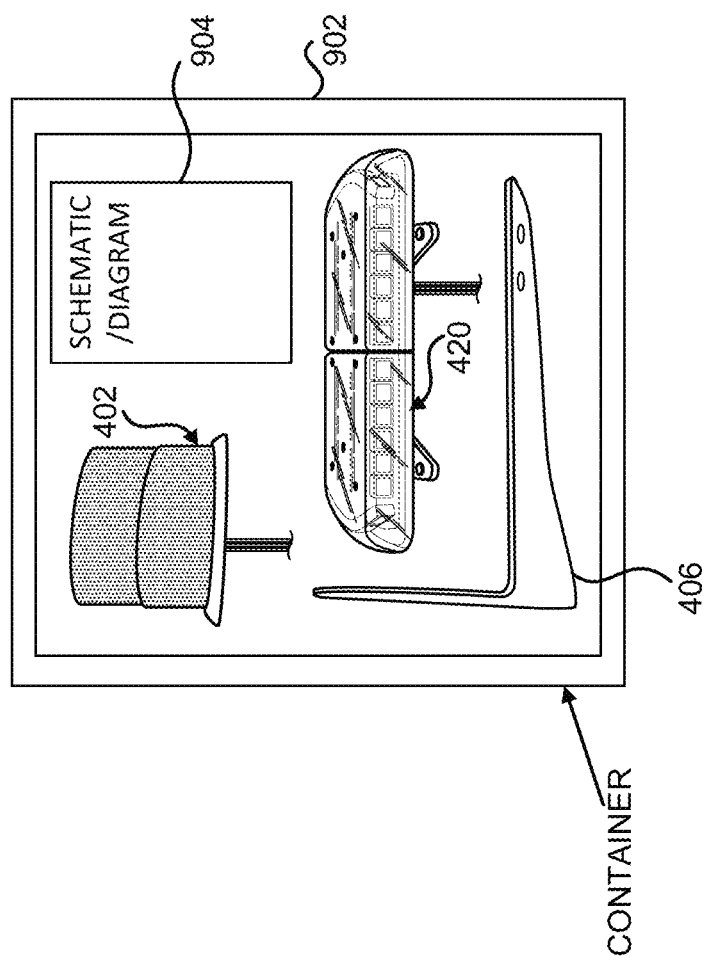
FIG. 9 is a simplified diagram illustrating a kit including one or more indicators, according to one or more embodiments of the disclosure.

FIG. 9 is a simplified diagram illustrating a kit including one or more indicators, according to one or more embodiments of the disclosure. The kit may include a number of components. The kit may include a container 902. The kit may include one or more lights 402, 420 positioned within the container. The lights 402, 420 may include attached conductors or wire assemblies. In another embodiment, the kit may include conductors or wire assemblies positioned within the container. The kit may include at least on conductor or wire assembly per light 402, 420. The kit may include mounting components positioned within the container 902, such as a bracket or other mount and corresponding fasteners. The kit may include instructions, diagrams, schematics, a document including a link to a website, and/or other user documents 904 positioned within the container 902. Such documents may be in a hardcopy or paper format, and/or a digital format (e.g., DVD, USB key, or other similar media).

This application is a divisional of U.S. Non-Provisional application Ser. No. 18/144,290, filed May 8, 2023, titled "SYSTEMS, METHODS, AND CONTROLLERS TO ENHANCE HEAVY EQUIPMENT WARNING," which is a continuation of U.S. Non-Provisional application Ser. No. 17/848,429, filed Jun. 24, 2022, titled "SYSTEMS, METHODS, AND CONTROLLERS TO ENHANCE HEAVY EQUIPMENT WARNING," now U.S. Pat. No. 11,686,070, issued Jun. 27, 2023, which claims priority to and the benefit of U.S. Provisional Application No. 63/364,179, filed May 4, 2022, titled "SYSTEMS, METHODS, AND CONTROLLERS TO ENHANCE HEAVY EQUIPMENT WARNING," the disclosures of which are incorporated herein.

In the drawings and specification, several embodiments of systems and methods to activate indicators have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A system to change an operational state of one or more indicators positioned on hydraulic equipment, the system comprising:
    an actuator configured to transition to an inactive position and an active position, (a) the actuator when in the inactive position to prevent hydraulic operation of the hydraulic equipment and (b) the actuator when in the active position to allow one or more of (i) hydraulic operation or (ii) activate one or more hydraulic operation controls;
    one or more indicators; and
    a switch connected to the one or more indicators and the actuator such that the actuator is configured to close the switch when the actuator is transitioned to the active position to change an operational state of the one or more indicators from a first operational state to a second operational state, thereby to provide warning that the hydraulic equipment is in an operation mode.

2. The system of claim 1, wherein the one or more indicators includes a light, and wherein the change from the first operational state to the second operational state includes one or more of:
    an activation of the light;
    a change in a color of the light;
    an activation or deactivation of a strobe output for the light; or
    an alteration of a frequency of a strobe output for the light.

3. The system of claim 1, wherein the switch is positioned proximate to the actuator.

4. The system of claim 1, wherein the one or more indicators is positioned on one or more locations on an outer surface of the hydraulic equipment.

5. The system of claim 4, wherein the one or more indicators includes one or more of (a) one or more lights or (b) one or more audio signals.

6. The system of claim 5, wherein the one or more lights includes one or more of a strobe light, a directional light, a beacon, underglow lights, undercarriage lights, directional lights, or some combination thereof.

7. The system of claim 5, wherein one of the one or more lights is positioned on an upper surface of a cabin of the hydraulic equipment to provide 360 degrees of illumination, the illumination sufficient to provide indication that hydraulics of the hydraulic equipment is in a state of operation.

8. The system of claim 5, wherein one of the one or more lights is positioned on a top surface of a rear portion of the hydraulic equipment and comprises a light bar, and wherein the rear portion of the hydraulic equipment substantially contains an engine and one or more hydraulic pumps.

9. The system of claim 4, wherein the one or more indicators is attached to the outer surface of the equipment via one or more of a magnet, fastener, a mechanical bond, or some combination thereof, and wherein the fastener includes one or more of a screw, a rivet, a nut and bolt, a force fit connector and corresponding base, or some combination thereof.

10. The system of claim 1, wherein the actuator is connected to an additional actuator such that actuation of the actuator to the active position is configured to actuate the additional actuator to a position in which the additional actuator is configured to prevent an operator from exiting the hydraulic equipment.

11. A system to change an operational state of one or more lights positioned on hydraulic equipment to provide warning that the hydraulic equipment is in an operation mode, the system comprising:
an initiation lever positioned proximate an operator's seat of the hydraulic equipment and configured to be actuatable to an inactive position and an active position, (a) the initiation lever when in the inactive position configured to prevent operation of the hydraulic equipment and (b) the initiation lever when in the active position configured to allow one or more of (i) all operation of the hydraulic equipment, (ii) activation of operation controls of the hydraulic equipment, or (iii) hydraulic operation of the hydraulic equipment;
a power source;
one or more lights configured to provide illumination to warn that the hydraulic equipment is in the operation mode when the initiation lever is in the active position; and
a switch connected to the power source, the one or more lights, and the operation controls, the switch positioned proximate the initiation lever, the initiation lever configured to close the switch when the initiation lever is in the active position and open the switch when the initiation lever is in the inactive position, and when the switch is closed, the switch creates a circuit between the power source and the operation controls and a circuit between the power source and the one or more lights to change an operational state of the one or more lights from a first operational state to a second operational state, thereby to provide warning that the hydraulic equipment is in the operation mode.

12. The system of claim 11, wherein the change from the first operational state to the second operational state includes one or more of:
an activation of at least one of the one or more lights;
a change in a color of at least one of the one or more lights;
an activation or deactivation of a strobe output for at least one of the one or more lights; or
an alteration of a frequency of a strobe output for at least one of the one or more lights.

13. The system of claim 11, wherein the one or more lights is positioned on one or more outer surfaces of the hydraulic equipment.

14. The system of claim 13, wherein the one or more outer surfaces includes one or more of (a) a top surface above a cabin of the hydraulic equipment, (b) a top surface at a rear of the hydraulic equipment, or (c) the rear of the hydraulic equipment.

15. The system of claim 11, wherein the one or more lights includes a color and lumens sufficient to be visible during daytime and nighttime.

16. The system of claim 11, wherein the initiation lever is connected to an additional lever such that actuation of the initiation lever to the active position is configured to actuate the additional lever to a position in which the additional lever is configured to prevent an operator from exiting the hydraulic equipment.

17. A system to change an operational state of one or more indicators positioned on hydraulic equipment, the system comprising:
an actuator configured to transition to an inactive position and an active position, (a) the actuator when in the inactive position to prevent hydraulic operation of the hydraulic equipment and (b) the actuator when in the active position to allow one or more of (i) hydraulic operation or (ii) activate one or more hydraulic operation controls;
one or more indicators including one or more lights; and
a switch connected to the one or more indicators and the actuator such that the actuator is configured to close the switch when the actuator is transitioned to the active position to change an operational state of the one or more indicators from a first operational state to a second operational state, thereby to provide warning that the hydraulic equipment is in an operation mode.

18. The system of claim 17, wherein the change from the first operational state to the second operational state includes one or more of:
an activation of the one or more lights;
a change in a color of the one or more lights;
an activation or deactivation of a strobe output for the 1 one or more lights; or
an alteration of a frequency of a strobe output for the one or more lights.

19. The system of claim 18, wherein the switch is positioned proximate to the actuator, and wherein the one or more lights is positioned on one or more locations on an outer surface of the hydraulic equipment.

20. The system of claim 10, wherein the one or more indicators also includes one or more audio signals.

21. The system of claim 18, wherein the one or more lights includes one or more of a strobe light, a directional light, a beacon, underglow lights, undercarriage lights, directional lights, or some combination thereof.

22. The system of claim 18, wherein one of the one or more lights is positioned on an upper surface of a cabin of the hydraulic equipment to provide 360 degrees of illumination, the illumination sufficient to provide indication that hydraulics of the hydraulic equipment is in a state of operation.

23. The system of claim 22, wherein one of the one or more lights is positioned on a top surface of a rear portion of the hydraulic equipment and comprises a light bar, and wherein the rear portion of the hydraulic equipment substantially contains an engine and one or more hydraulic pumps.

24. The system of claim 22, wherein the one or more indicators is attached to the outer surface of the equipment via one or more of a magnet, fastener, a mechanical bond, or some combination thereof, and wherein the fastener includes one or more of a screw, a rivet, a nut and bolt, a force fit connector and corresponding base, or some combination thereof.

25. The system of claim 21, wherein the actuator is connected to an additional actuator such that actuation of the actuator to the active position is configured to actuate the additional actuator to a position in which the additional actuator is configured to prevent an operator from exiting the hydraulic equipment.

\* \* \* \* \*